(12) United States Patent
Nomoto

(10) Patent No.: US 10,616,427 B2
(45) Date of Patent: Apr. 7, 2020

(54) MEDIUM FEEDING DEVICE, IMAGE READING APPARATUS, AND RECORDING APPARATUS

(71) Applicant: SEIKO EPSON CORPORATION, Tokyo (JP)

(72) Inventor: Kosuke Nomoto, Fukutsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/144,939

(22) Filed: Sep. 27, 2018

(65) Prior Publication Data

US 2019/0098157 A1 Mar. 28, 2019

(30) Foreign Application Priority Data

Sep. 28, 2017 (JP) ................. 2017-187585

(51) Int. Cl.
*B65H 7/00* (2006.01)
*H04N 1/00* (2006.01)
*B65H 3/52* (2006.01)
*B65H 3/06* (2006.01)
*B65H 7/12* (2006.01)

(52) U.S. Cl.
CPC ......... *H04N 1/00628* (2013.01); *B65H 3/063* (2013.01); *B65H 3/0653* (2013.01); *B65H 3/5215* (2013.01); *B65H 3/5284* (2013.01); *B65H 7/00* (2013.01); *B65H 7/125* (2013.01); *H04N 1/00018* (2013.01); *H04N 1/00602* (2013.01); *B65H 2402/46* (2013.01); *B65H 2511/524* (2013.01); *B65H 2515/32* (2013.01); *B65H 2515/704* (2013.01)

(58) Field of Classification Search
CPC ............... B65H 3/0669; B65H 7/06; B65H 2301/42134; B65H 2403/732; B65H 2511/529
See application file for complete search history.

(56) References Cited

U.S. PATENT DOCUMENTS

| 7,392,980 | B2 * | 7/2008 | Takeuchi | B65H 3/5261 271/10.01 |
| 7,591,460 | B2 * | 9/2009 | Ohshima | B65H 7/12 271/110 |
| 2007/0126171 | A1 | 6/2007 | Takeuchi et al. | |
| 2017/0210582 | A1 * | 7/2017 | Okano | B65H 3/06 |

FOREIGN PATENT DOCUMENTS

JP 2017-061350 A 3/2017

* cited by examiner

*Primary Examiner* — Howard J Sanders
(74) *Attorney, Agent, or Firm* — Workman Nydegger

(57) ABSTRACT

A medium feeding device includes a feed roller that feeds a medium from a medium placement unit on which the medium is placed a separation roller that nips the medium between the feed roller and the separation roller to separate the medium, a motor that applies a rotational torque to the separation roller, and a control unit that controls the motor. The rotational torque is transmitted to the separation roller from the motor not via a torque limiter and the separation roller separates the medium with the rotational torque applied to the separation roller.

7 Claims, 19 Drawing Sheets

MEDIUM FEEDING DEVICE, IMAGE READING APPARATUS, AND RECORDING APPARATUS

BACKGROUND

1. Technical Field

The present invention relates to a medium feeding device feeding a medium and an image reading apparatus provided and a recording apparatus which are provided with the medium feeding device.

2. Related Art

Hereinafter, a scanner, which is an example of an image reading apparatus, is provided with a feeding device that feeds a medium (document) and many feeding devices are provided with a feed roller that feeds a medium and a separation roller (also called separating roller in some cases) that nips a medium between the feed roller and the separation roller to separate the medium (for example, refer to JP-A-2017-61350).

A predetermined rotational torque is applied to the separation roller via a torque limiter. In a case where there is no document between the feed roller and the separation roller, the separation roller is rotated by a rotational torque received from the feed roller and in a case where a document is present between a document to be fed and the separation roller (in a case where multi-feeding is prevented), the rotation stops.

The separating ability of the separation roller is influenced by the torque setting of the torque limiter. When a set torque is large, there is a high possibility of non-feeding although the separation ability is improved. In contrast, when a set torque is small, multi-feeding is likely to occur although there is a low possibility of non-feeding. Therefore, the torque setting of the torque limiter is extremely important in realizing appropriate paper feeding. However, there are various kinds of media and torque setting appropriate for all of the various kinds of media is very difficult to be made. In this regard, there is room for improvement.

SUMMARY

An advantage of some aspects of the invention is to provide a device that is capable of separating a plurality of kinds of media more appropriately.

According to an aspect of the invention, there is provided a medium feeding device including a medium placement unit on which a medium is placed, a feed roller that feeds the medium from the medium placement unit, a separation roller that nips the medium between the feed roller and the separation roller to separate the medium, a motor that applies a rotational torque to the separation roller, and a control unit that controls the motor, in which the rotational torque is transmitted to the separation roller from the motor not via a torque limiter and the separation roller separates the medium with the rotational torque applied to the separation roller.

In this case, the rotational torque is transmitted to the separation roller from the motor not via the torque limiter and the separation roller separates the medium with the rotational torque applied to the separation roller. Therefore, it is possible to easily adjust a medium separating ability of the separation roller by adjusting the rotational torque and thus it is possible to properly separate a plurality of kinds of media.

The medium feeding device may further include a multi-feeding detection unit that detects multi-feeding of the medium and that is provided on a downstream side of a nip position between the feed roller and the separation roller and in a case where it is determined that there is multi-feeding of the medium based on detection information from the multi-feeding detection unit, the control unit may cause the separation roller to rotate in a rotation direction in which the medium is returned to an upstream side.

In this case, the control unit causes the separation roller to rotate in the rotation direction in which the medium is returned to the upstream side in a case where it is determined that there is multi-feeding of the medium based on the detection information from the multi-feeding detection unit. Therefore, even when a leading end of the medium proceeds up to a position on the downstream side of the nip position between the feed roller and the separation roller, the medium can be returned to the upstream side and thus it is possible to properly perform a next feeding operation.

In the medium feeding device, in a case where it is determined that there is multi-feeding of the medium based on detection information from the multi-feeding detection unit, the control unit may increase the value of a current that is applied to the motor at the time of a next medium feeding operation such that the rotational torque is increased.

In this case, the control unit increases the value of a current that is applied to the motor at the time of a next medium feeding operation such that the rotational torque is increased in a case where it is determined that there is multi-feeding of the medium based on the detection information from the multi-feeding detection unit. Therefore, it is possible to suppress multi-feeding of the medium by increasing the separating ability of the separation roller.

The medium feeding device may further include a passage detection unit that detects passage of the medium and that is provided on a downstream side of a nip position between the feed roller and the separation roller, and in a case where the passage detection unit does not detect passage of a leading end of the medium until a predetermined period of time elapses after rotation of the feed roller is started, the control unit may decrease the value of a current applied to the motor such that the rotational torque is decreased.

In this case, the control unit decreases the value of a current applied to the motor such that the rotational torque is decreased in a case where the passage detection unit does not detect the passage of the leading end of the medium until the predetermined period of time elapses after the rotation of the feed roller is started. Therefore, it is possible to fix non-feeding of the medium by decreasing the separating ability of the separation roller.

According to another aspect of the invention, there is provided an image reading apparatus including a reader that reads an image, a pair of transportation rollers that transports a medium to a reading position of the reader, and the medium feeding device according to the above-described aspect that feeds the medium to the pair of transportation rollers.

In this case, it is possible to achieve the same effect as in the above-described aspect with the image reading apparatus.

In the image reading apparatus, the motor that applies the rotational torque to the separation roller may be different from a drive source of the feed roller and may be different from a drive source of the pair of transportation rollers.

In this case, the motor that applies the rotational torque to the separation roller is different from the drive source of the feed roller and is different from the drive source of the pair of transportation rollers. Therefore, the independence of control that is performed by using the separation roller is improved and the degree of freedom in control is improved.

According to still another aspect of the invention, there is provided a recording apparatus including a recording unit that performs recording on a medium, a pair of transportation rollers that transports the medium to a recording position of the recording unit, and the medium feeding device according to the above-described aspect that feeds the medium to the pair of transportation rollers.

In this case, it is possible to achieve the same effect as in the above-described aspect with the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
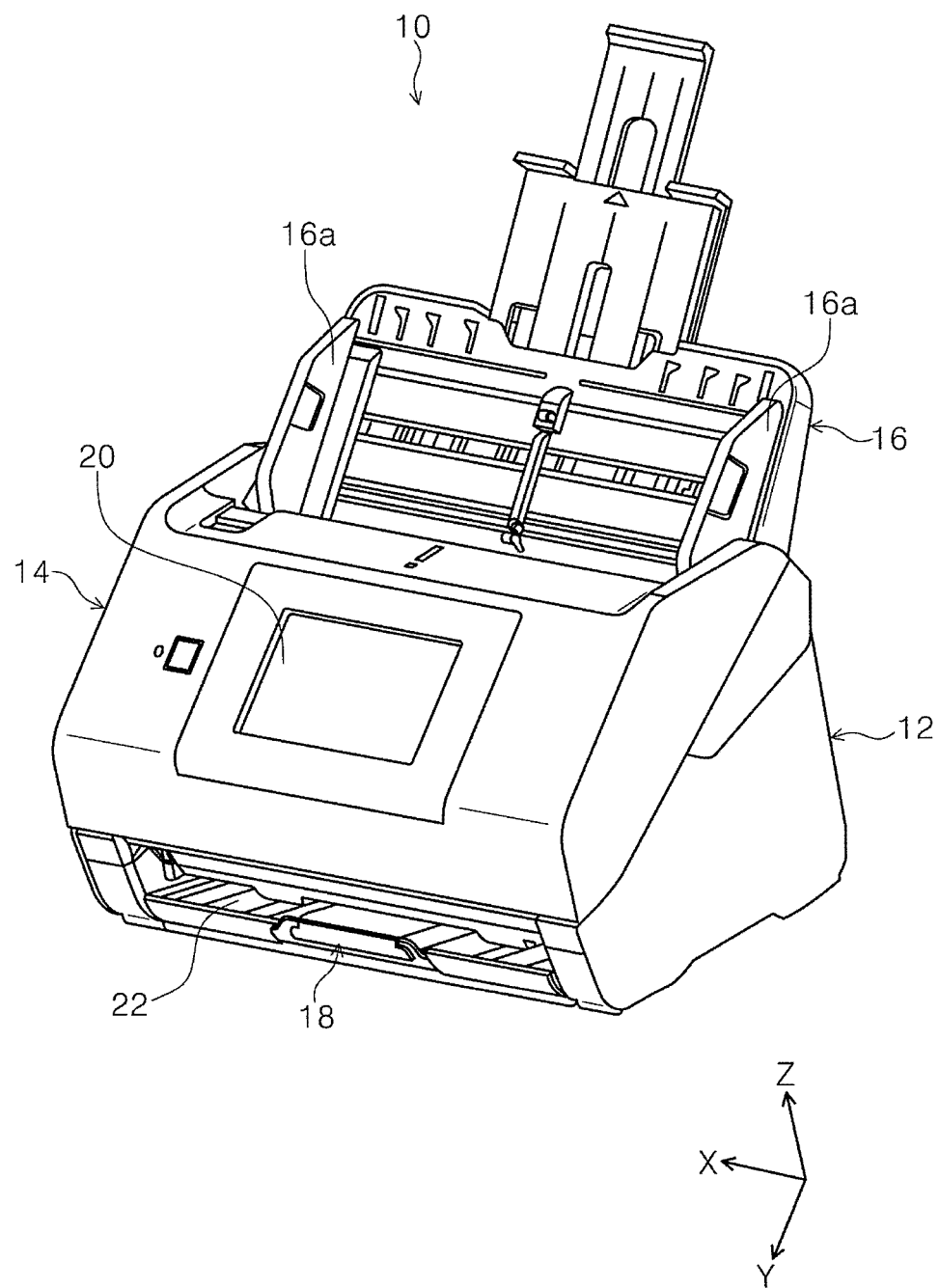
FIG. 1 is a perspective view of an outer appearance of a scanner according to a first embodiment.

Hereinafter, embodiments of the invention will be described based on the drawings. Note that, the same components in the embodiments will be given the same reference numerals. Description thereof will be made in only in a first embodiment and will be omitted in subsequent embodiments.

Figure 2:
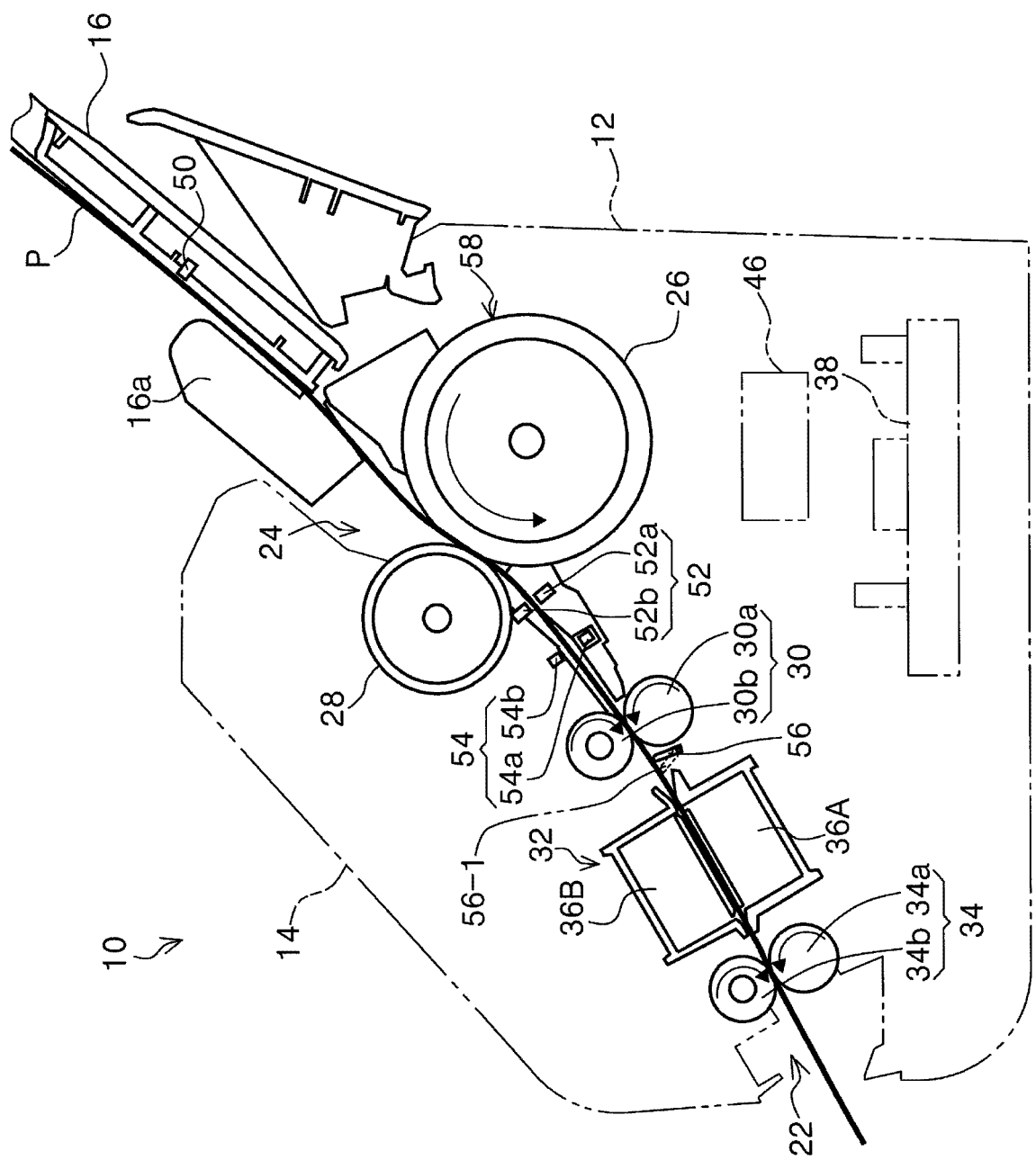
FIG. 2 is a side view illustrating a document feeding path of the scanner according to the first embodiment.
Figure 3:
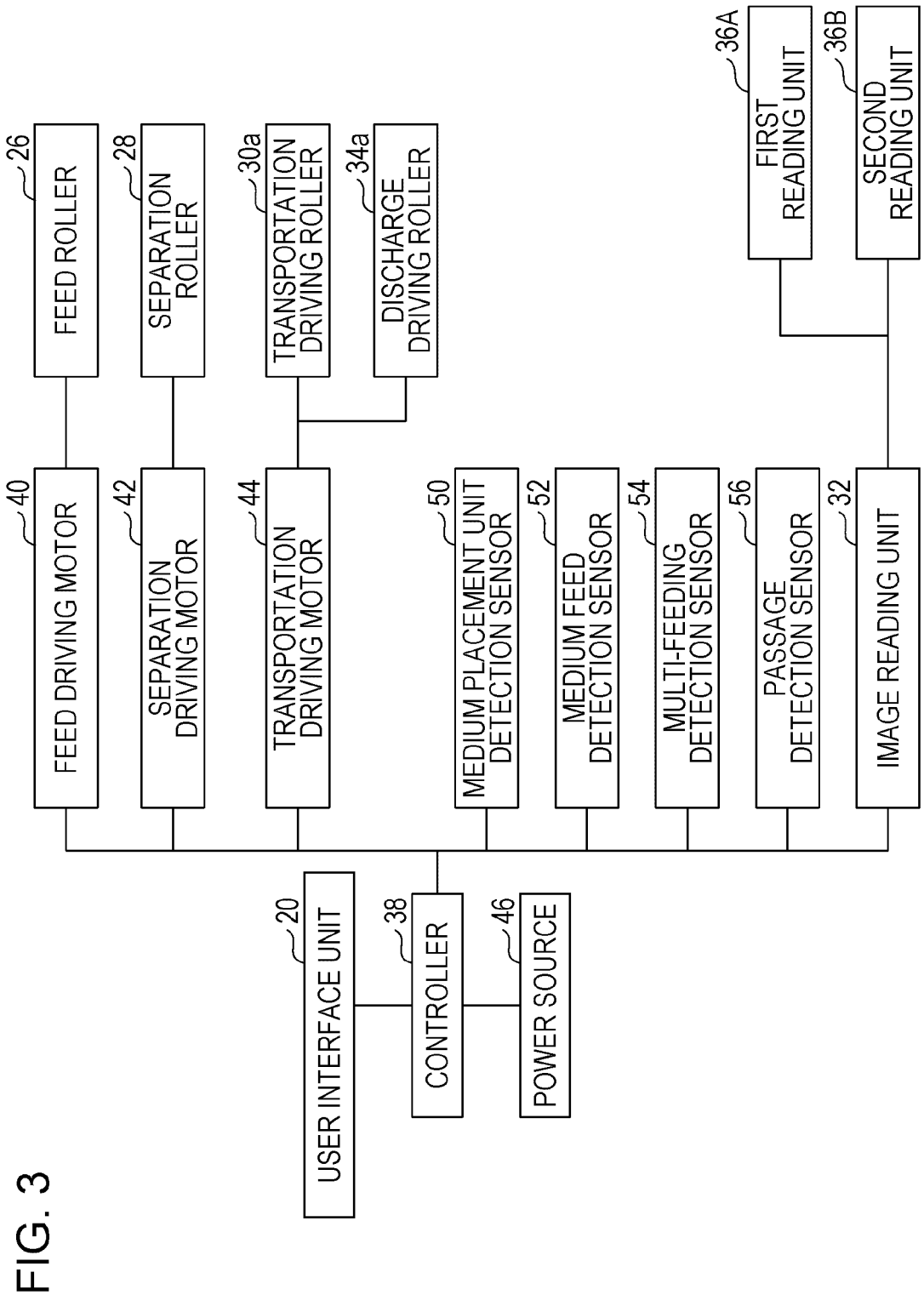
FIG. 3 is a block diagram of constituent elements constituting the scanner.

FIG. 1 is a perspective view of an outer appearance of a scanner according to the first embodiment, FIG. 2 is a side view illustrating a document feeding path of the scanner according to the first embodiment, and FIG. 3 is a block diagram of constituent elements constituting the scanner.

Figure 4:
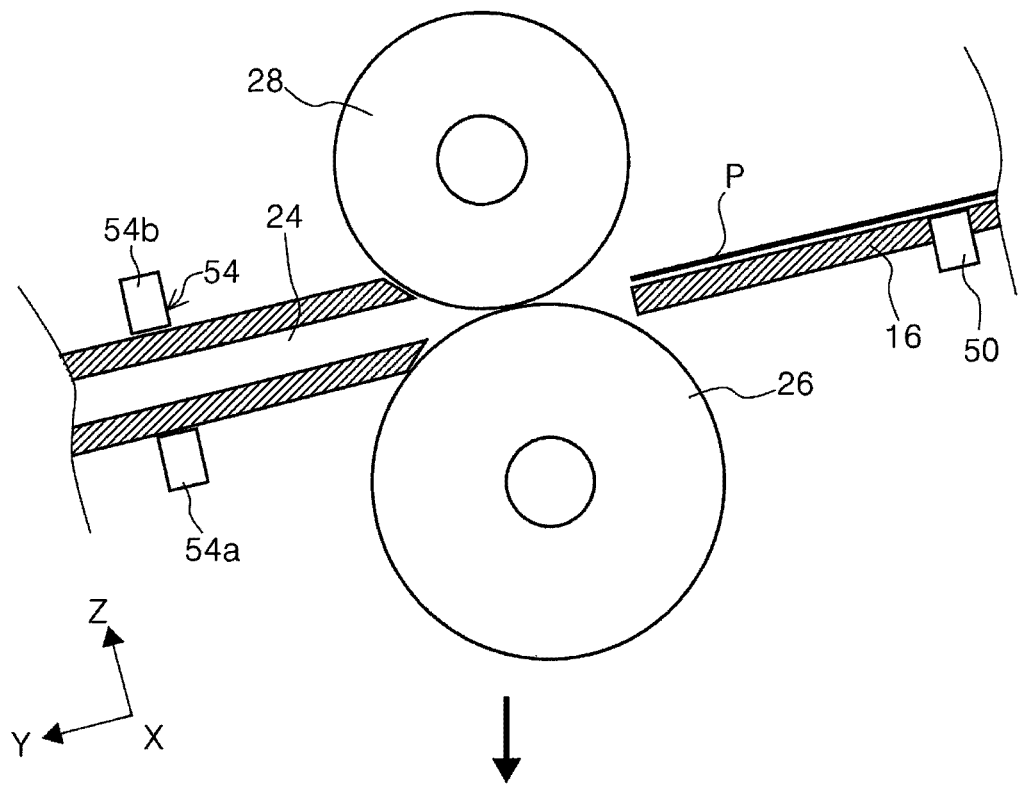
FIG. 4 is a schematic diagram illustrating the way in which a separation roller is operated when a single medium is fed in the first embodiment.
Figure 4:
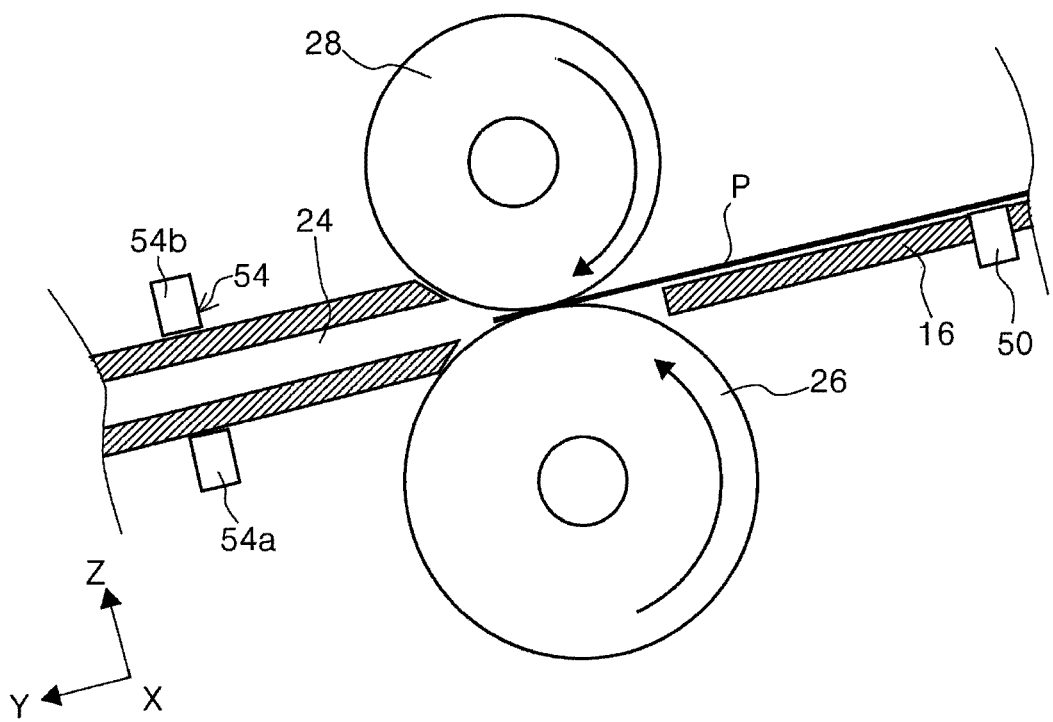
Figure 5:
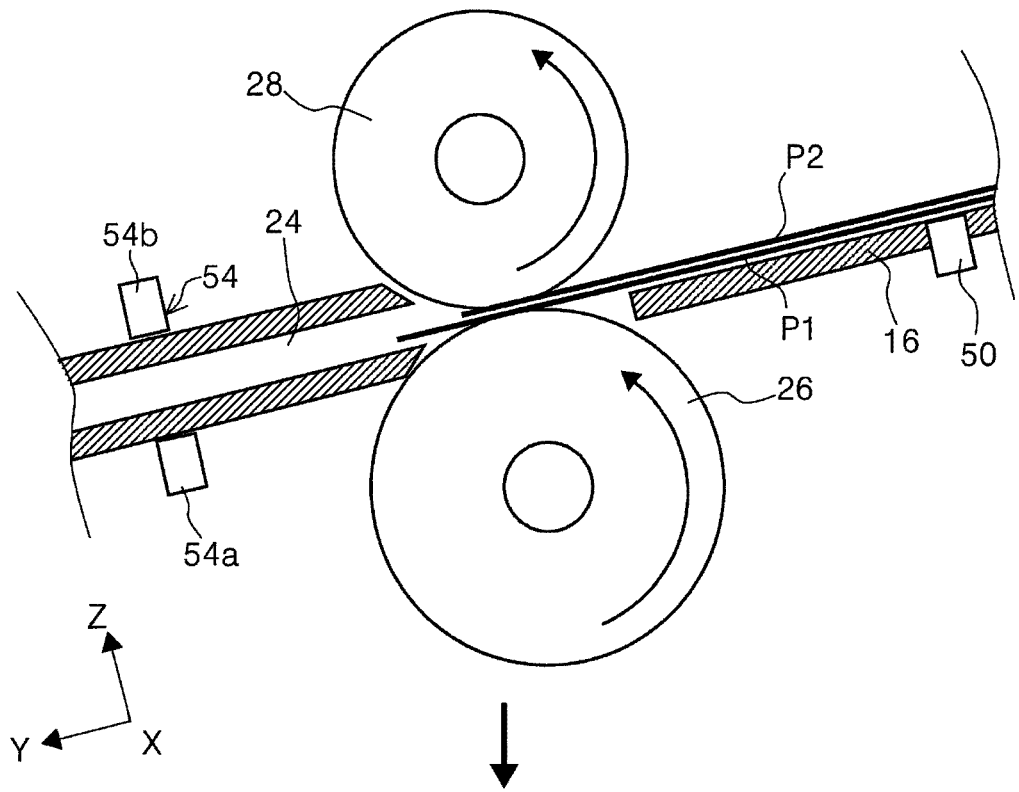
FIG. 5 is a schematic diagram illustrating the way in which the separation roller is operated in a case where there is multi-feeding when a plurality of media are fed in the first embodiment.
Figure 5:
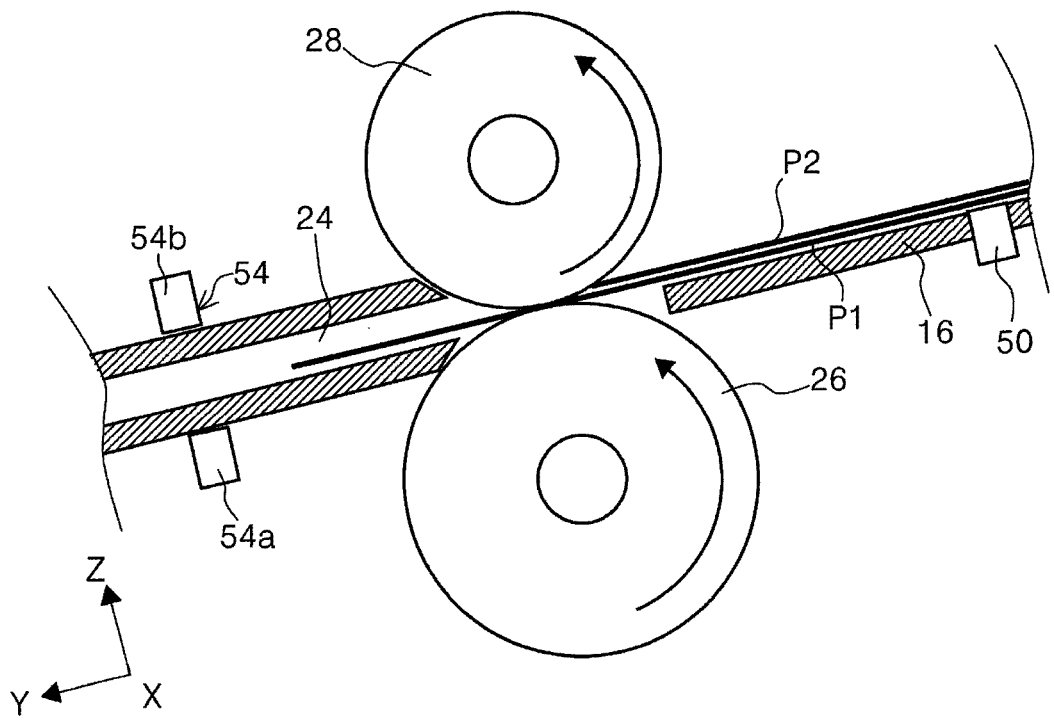
Figure 6:
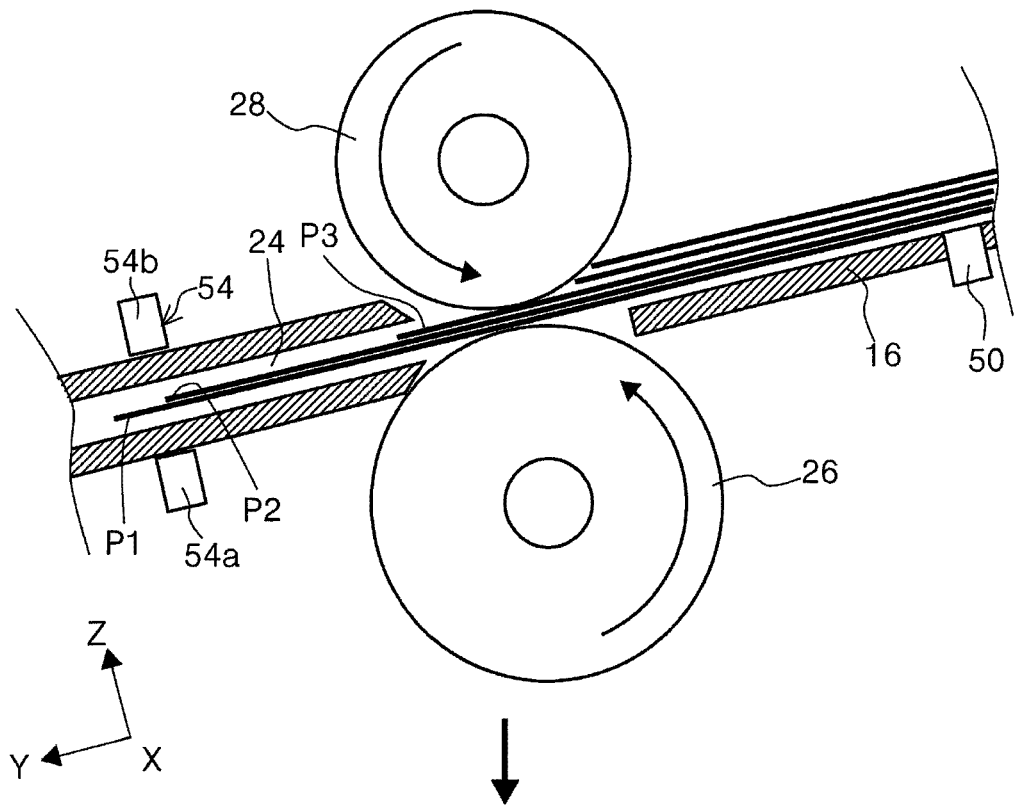
FIG. 6 is a schematic diagram illustrating the way in which the separation roller is operated in a case where a multi-feeding detection sensor detects multi-feeding in the first embodiment.
Figure 6:
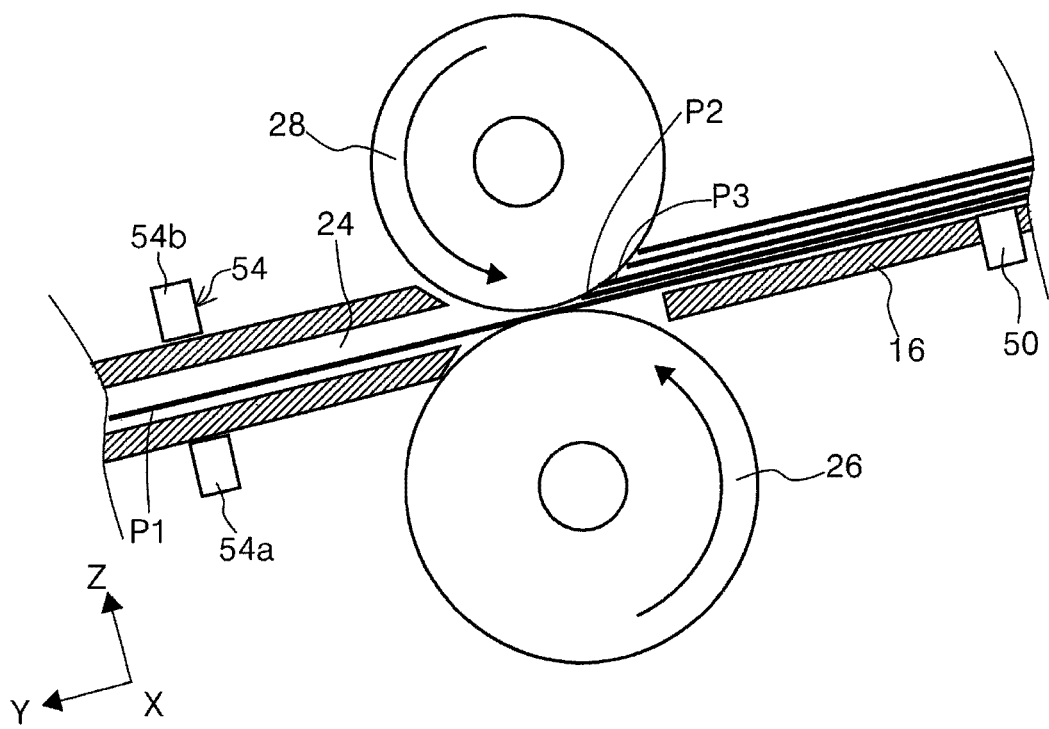
Figure 7:
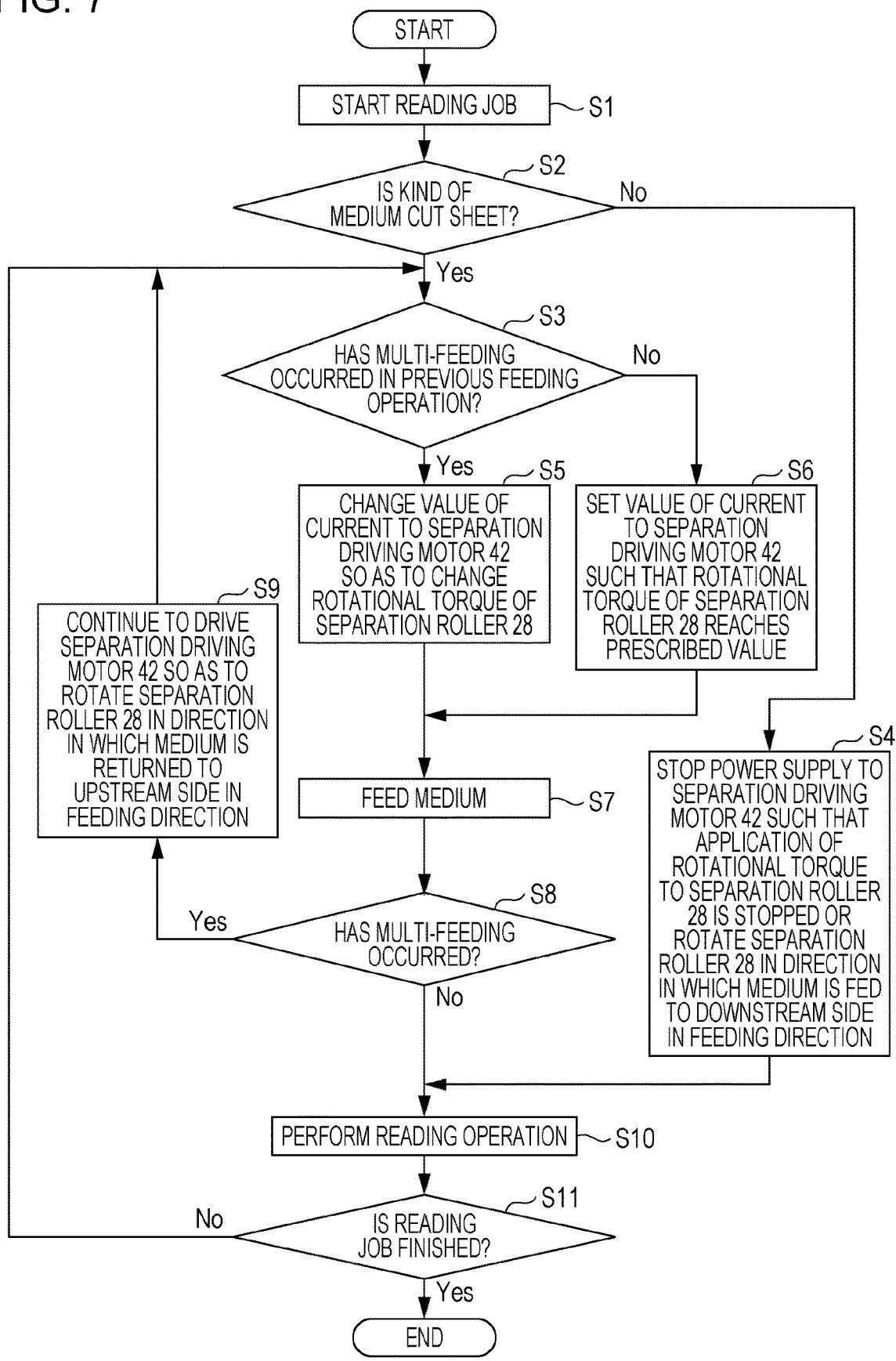
FIG. 7 is a flowchart illustrating the way in which the separation roller according to the first embodiment is controlled.

FIG. 4 is a schematic diagram illustrating the way in which a separation roller is operated when a single medium is fed in the first embodiment, FIG. 5 is a schematic diagram illustrating the way in which the separation roller is operated in a case where there is multi-feeding when a plurality of media are fed in the first embodiment, FIG. 6 is a schematic diagram illustrating the way in which the separation roller is operated in a case where a multi-feeding detection sensor detects multi-feeding in the first embodiment, and FIG. 7 is a flowchart illustrating the way in which the separation roller according to the first embodiment is controlled.

Figure 8:
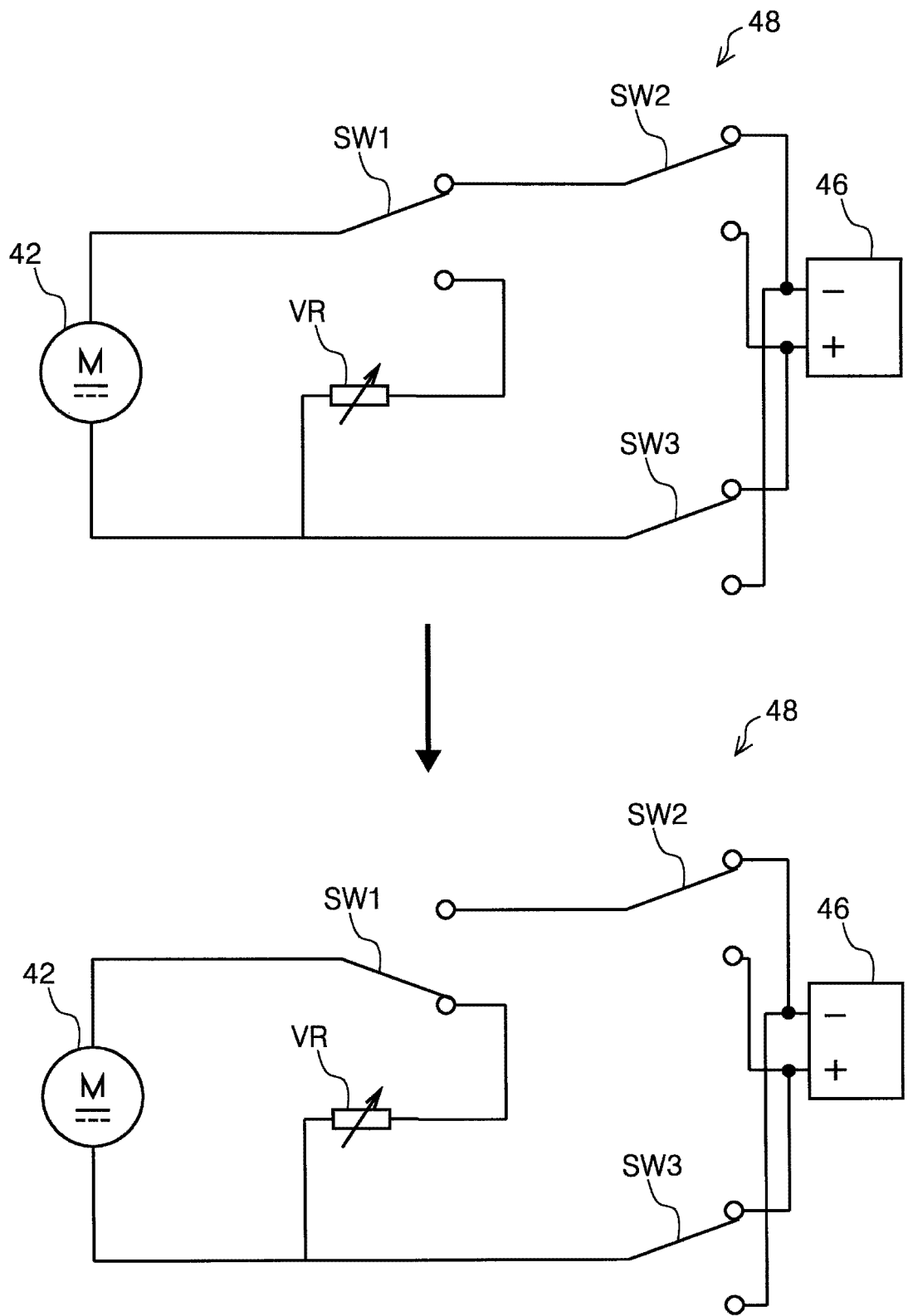
FIG. 8 is a schematic diagram illustrating a first circuit state and a second circuit state of a control circuit according to a second embodiment.
Figure 9:
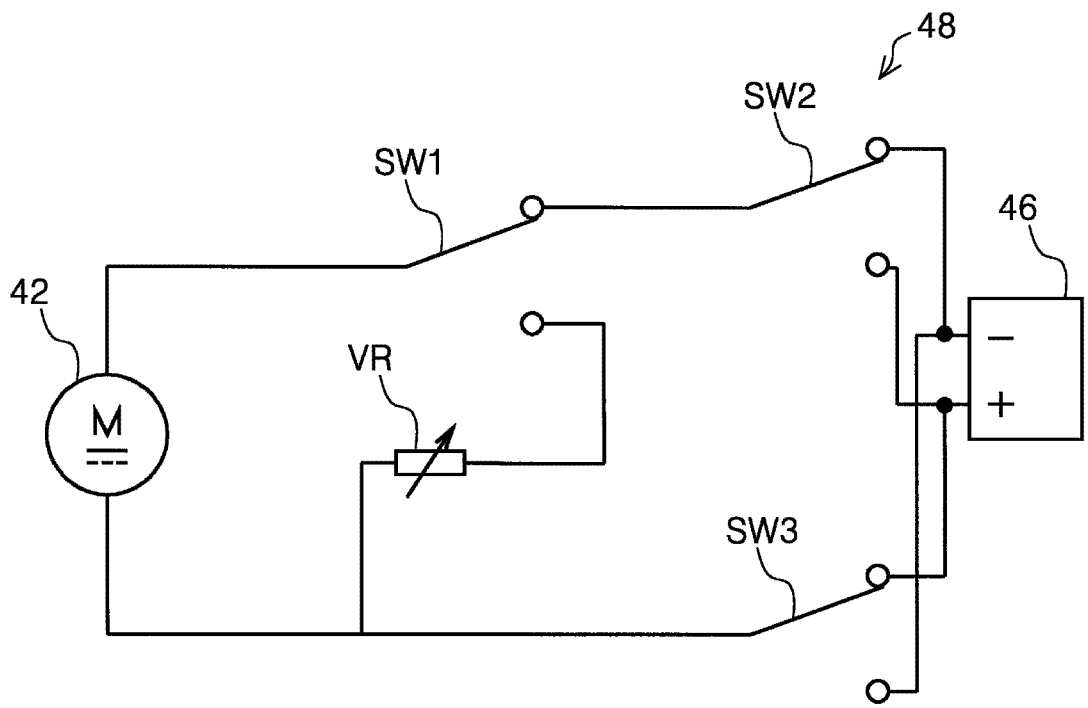
FIG. 9 is a schematic diagram illustrating the first circuit state and a third circuit state of the control circuit according to the second embodiment.
Figure 9:
Figure 9:
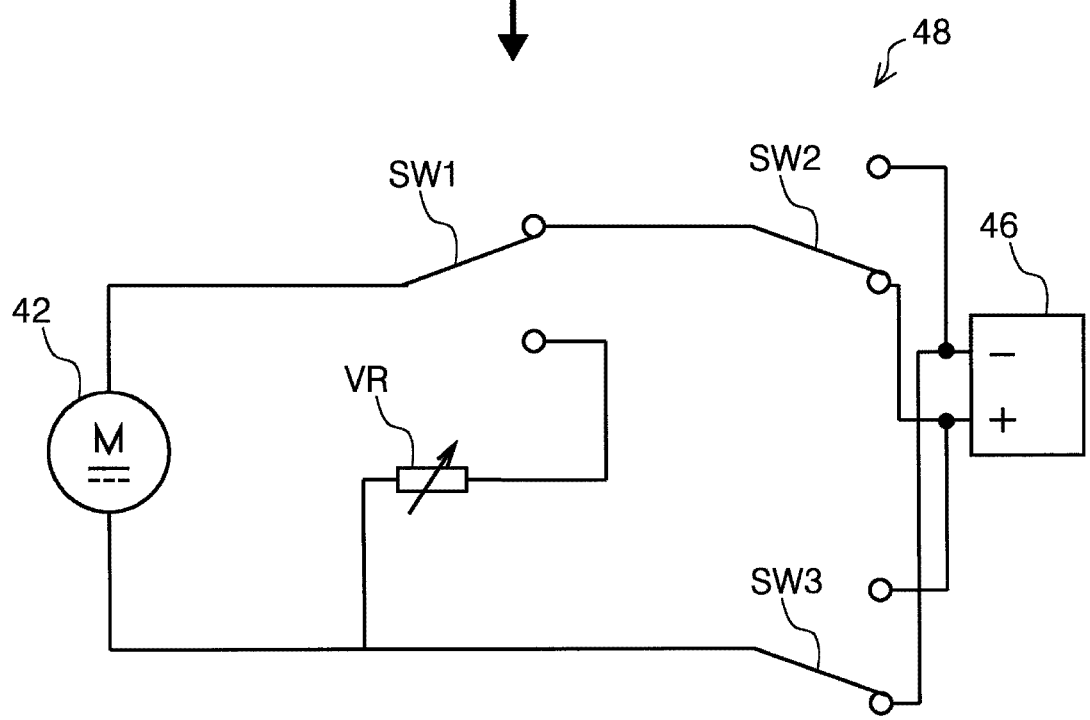
Figure 10:
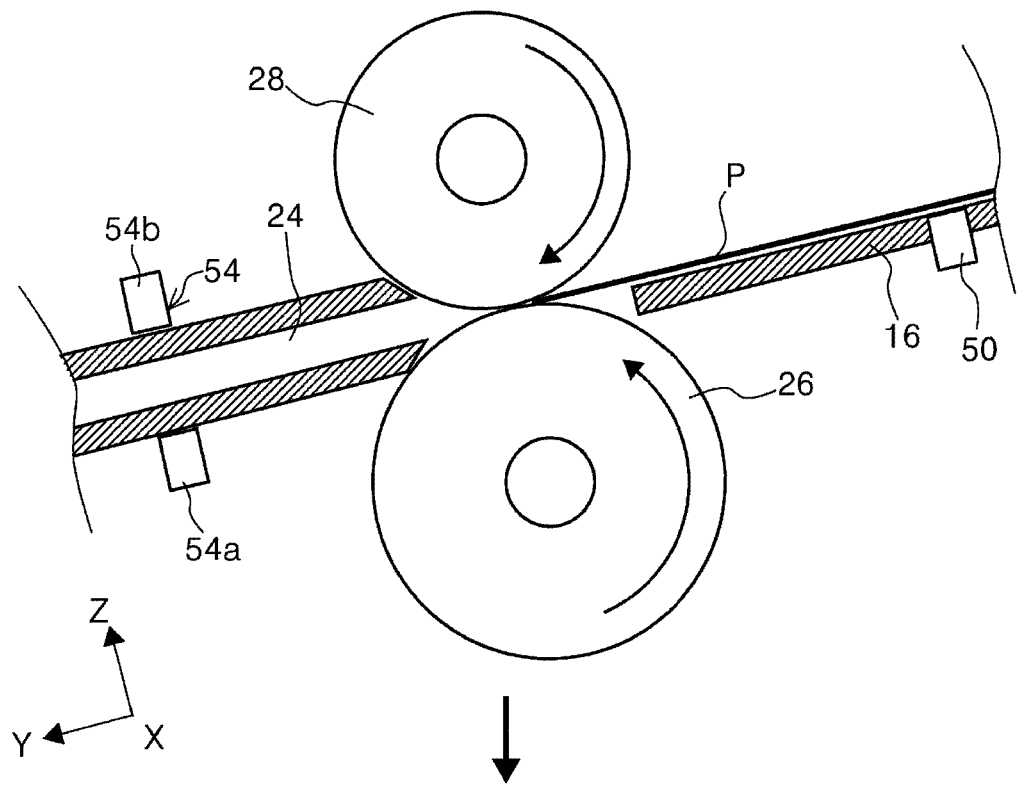
FIG. 10 is a schematic diagram illustrating the way in which the separation roller is operated when a single medium is fed in the second embodiment.
Figure 10:
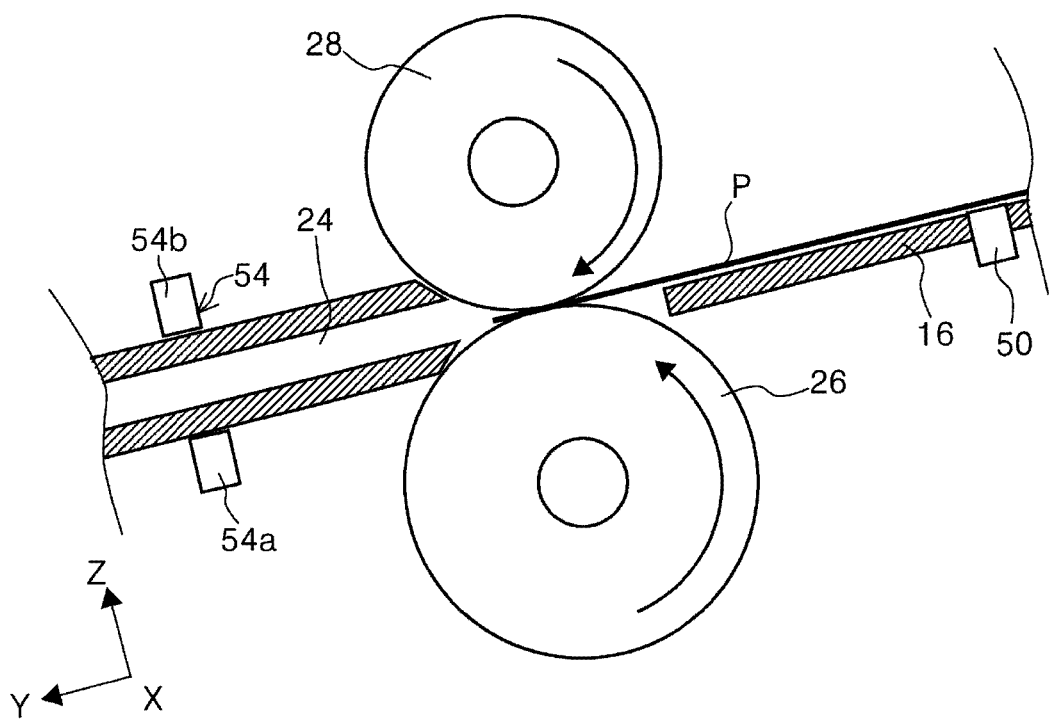

FIG. 8 is a schematic diagram illustrating a first circuit state and a second circuit state of a control circuit according to a second embodiment, FIG. 9 is a schematic diagram illustrating the first circuit state and a third circuit state of the control circuit according to the second embodiment, and FIG. 10 is a schematic diagram illustrating the way in which the separation roller is operated when a single medium is fed in the second embodiment.

Figure 11:
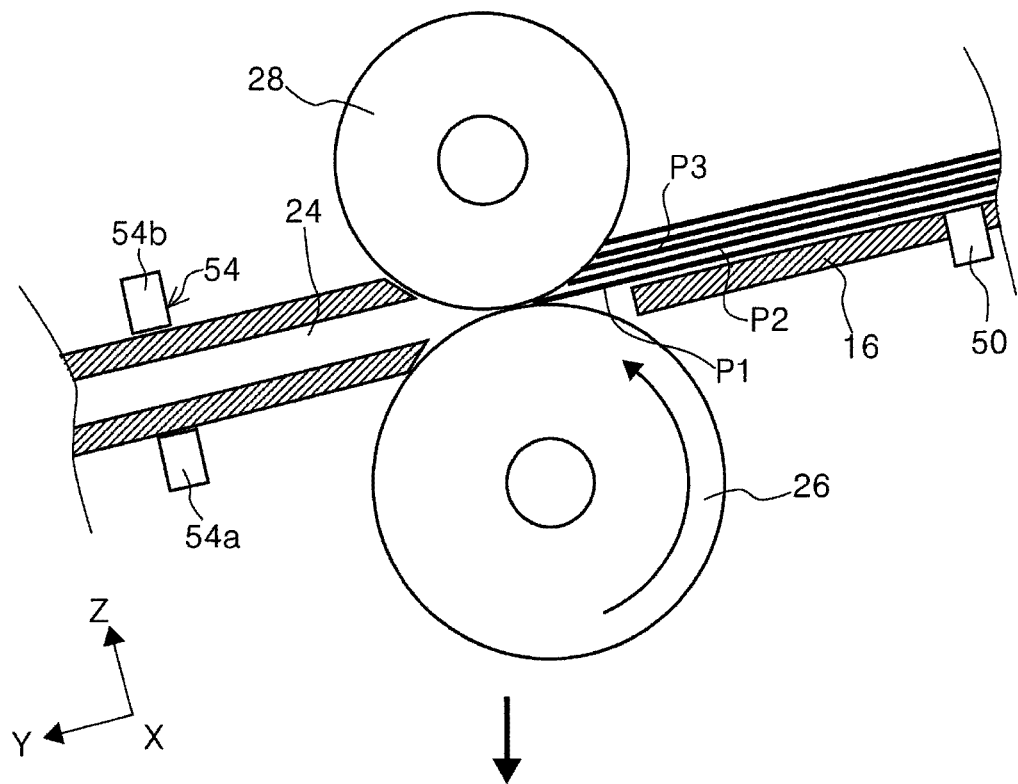
FIG. 11 is a schematic diagram illustrating the way in which the separation roller separates a medium when a plurality of media are fed in the second embodiment.
Figure 11:
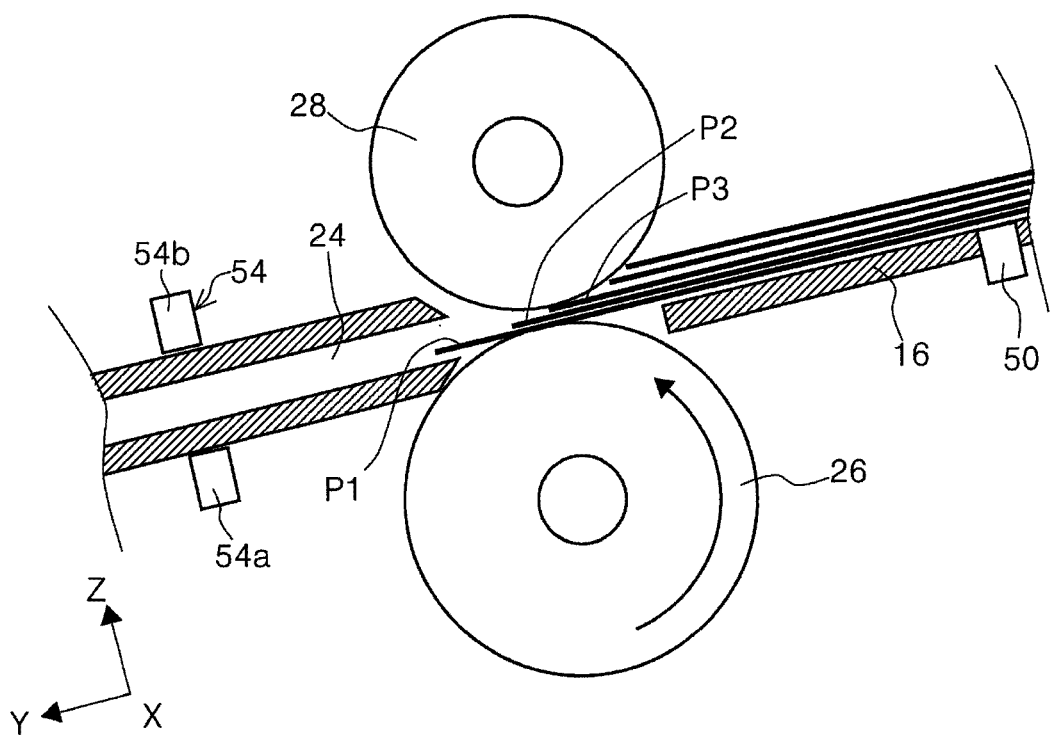
Figure 12:
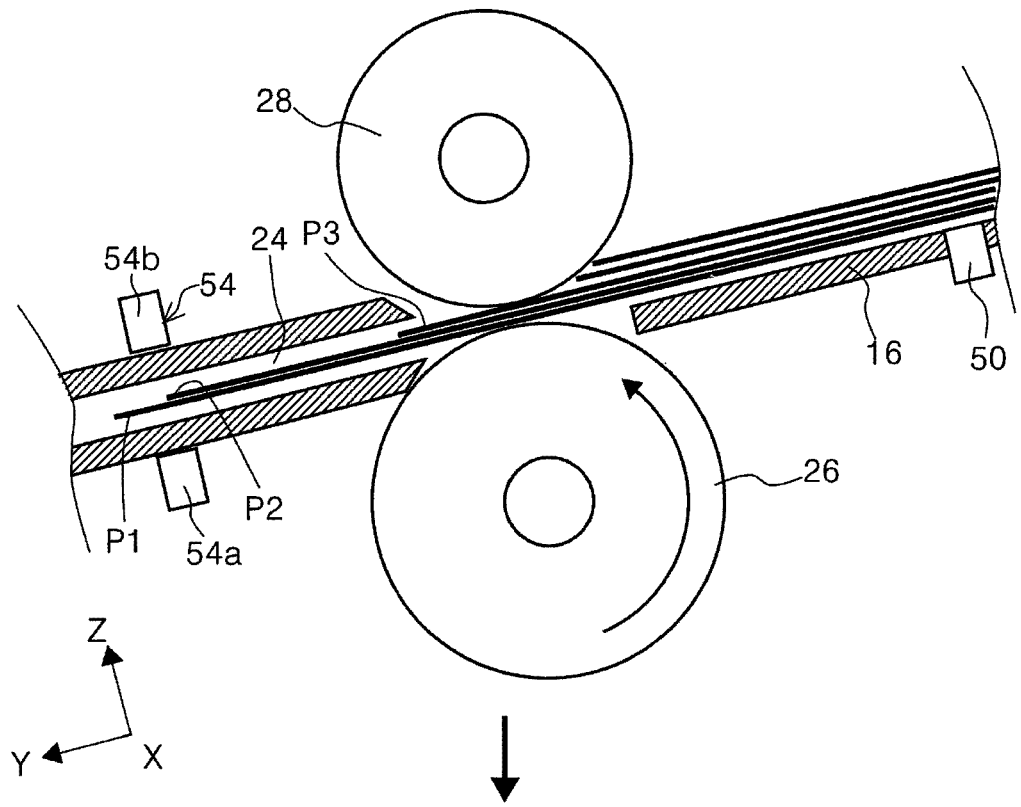
FIG. 12 is a schematic diagram illustrating the way in which the separation roller is operated in a case where there is multi-feeding when a plurality of media are fed in the second embodiment.
Figure 12:
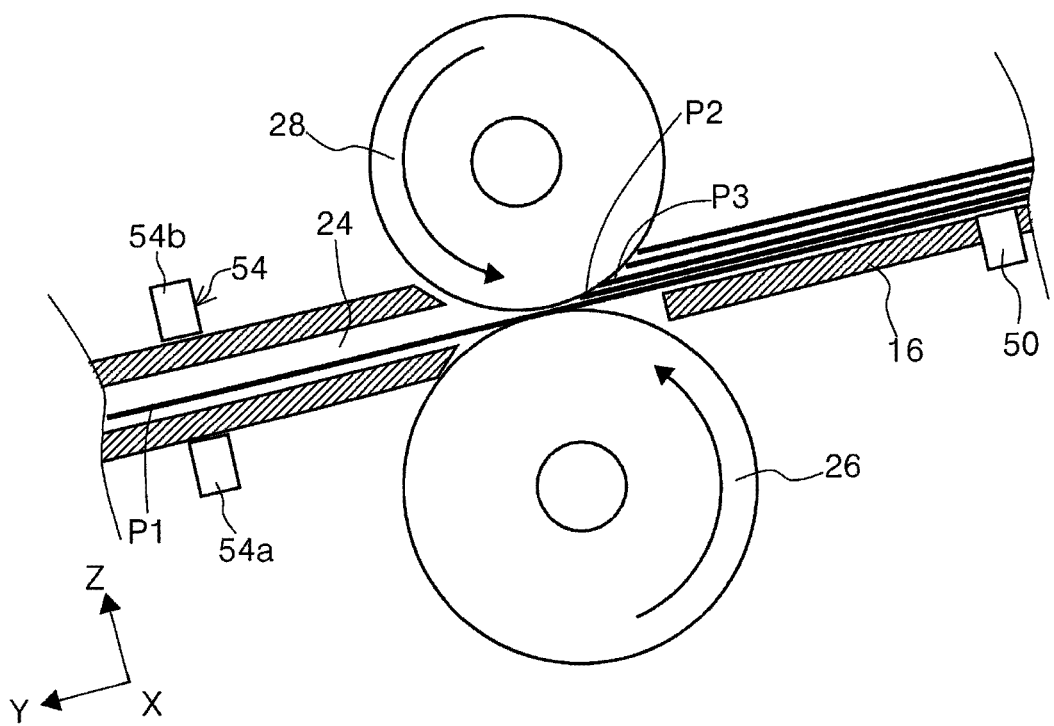
Figure 13:
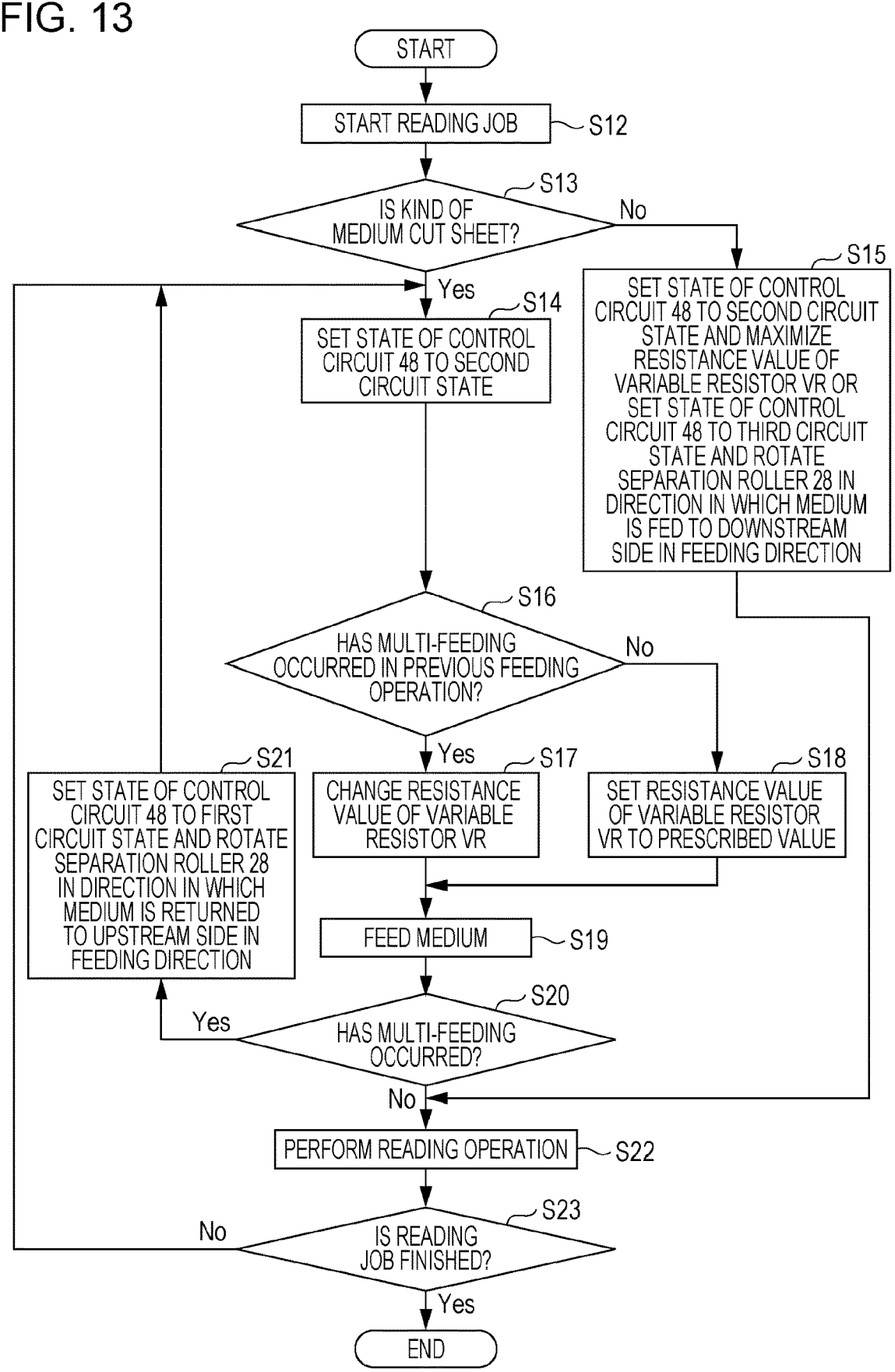
FIG. 13 is a flowchart illustrating the way in which the separation roller according to the second embodiment is controlled.

FIG. 11 is a schematic diagram illustrating the way in which the separation roller separates a medium when a plurality of media are fed in the second embodiment, FIG. 12 is a schematic diagram illustrating the way in which the separation roller is operated in a case where there is multi-feeding when a plurality of media are fed in the second embodiment, and FIG. 13 is a flowchart illustrating the way in which the separation roller according to the second embodiment is controlled.

Figure 14:
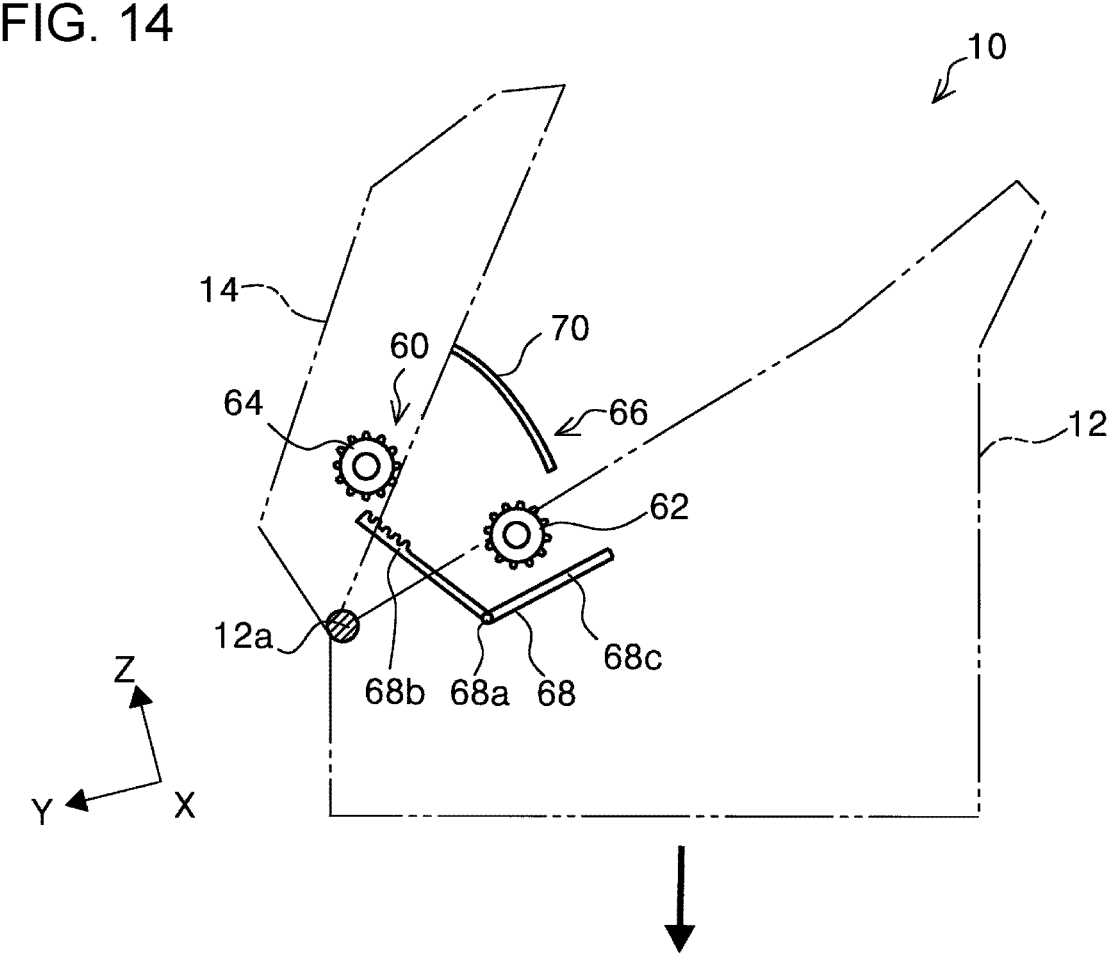
FIG. 14 is a schematic diagram illustrating a collision avoiding unit of a motive power transmitting gear according to a third embodiment.
Figure 14:
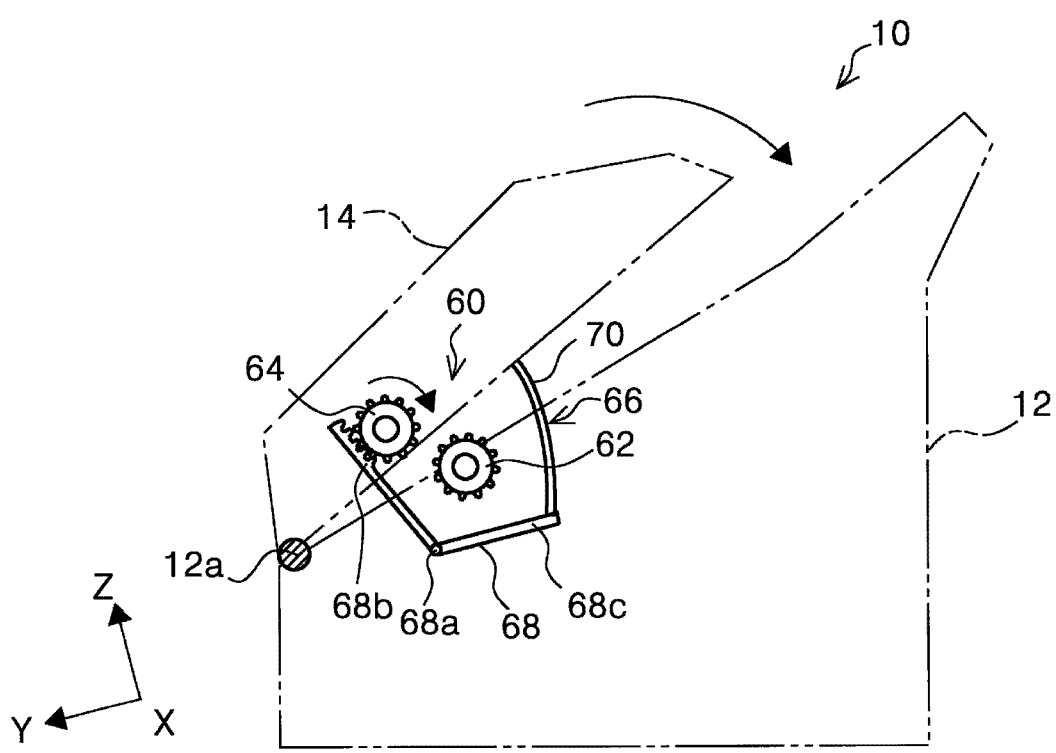
Figure 15:
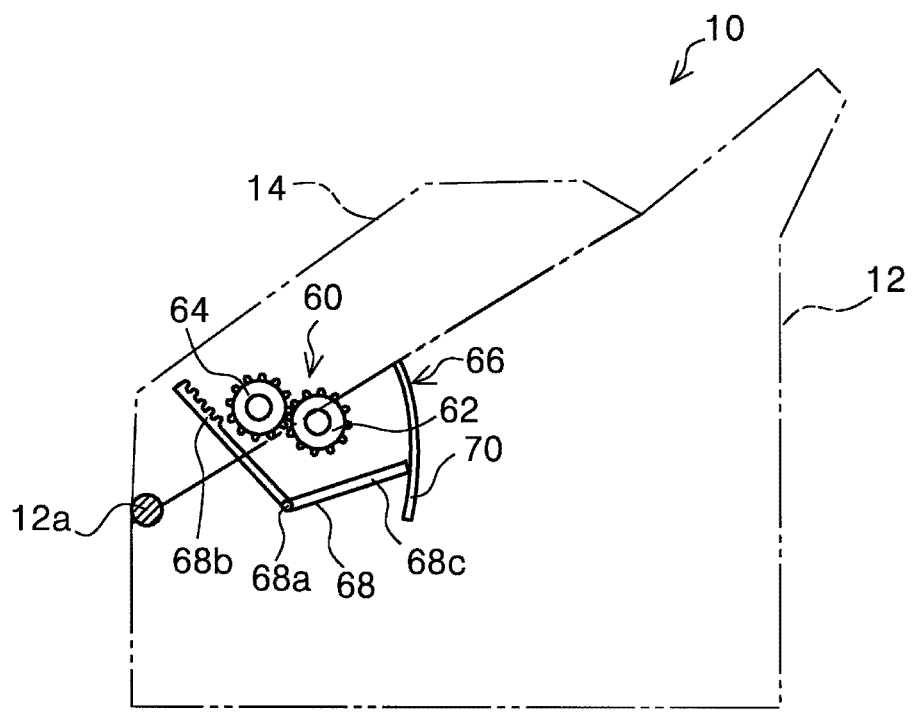
FIG. 15 is a schematic diagram illustrating the collision avoiding unit of the motive power transmitting gear according to the third embodiment.
Figure 15:
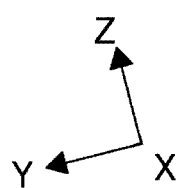
Figure 16:
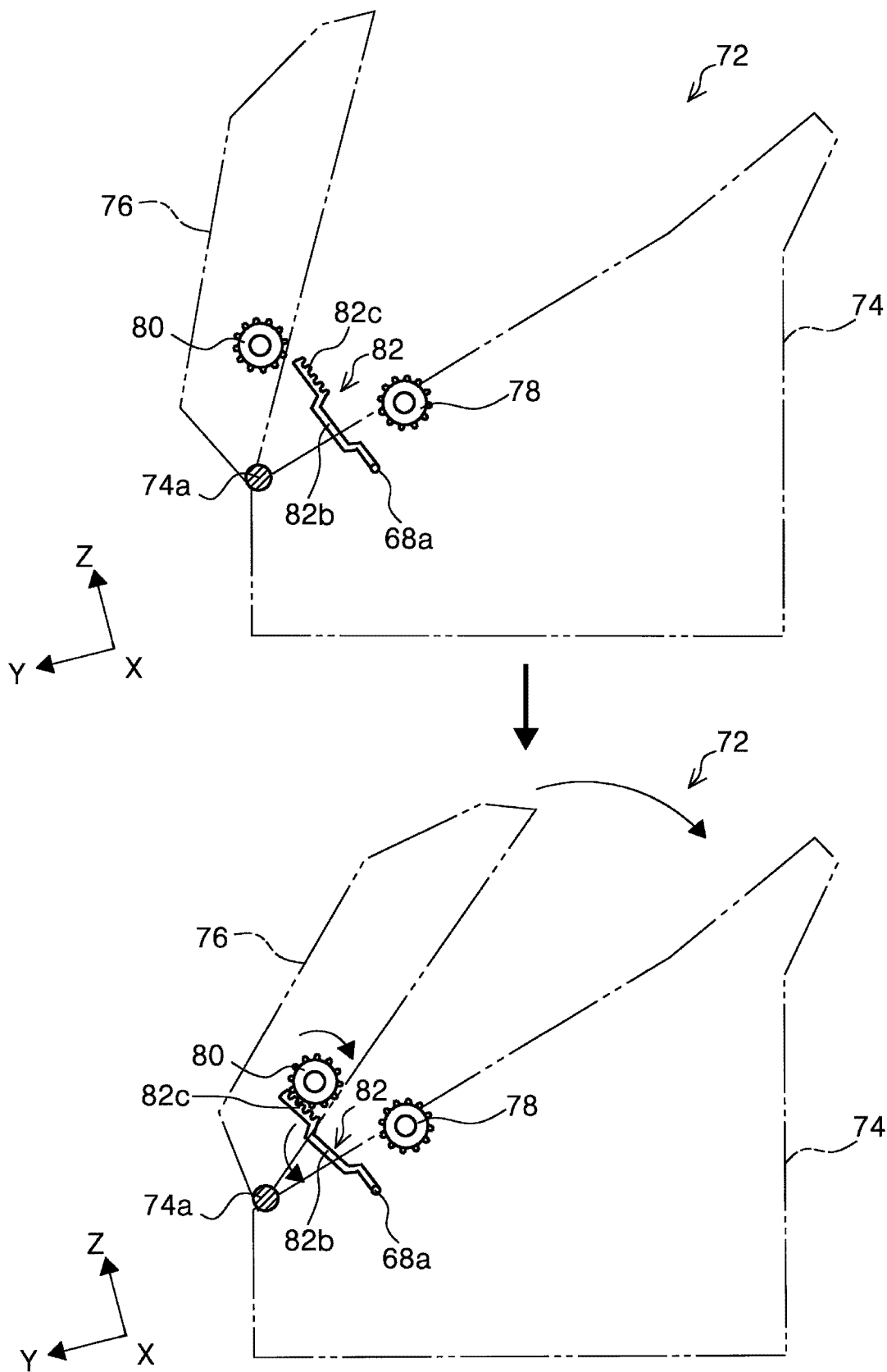
FIG. 16 is a schematic diagram illustrating a collision avoiding unit of a motive power transmitting gear according to a fourth embodiment.

FIG. 14 is a schematic diagram illustrating a collision avoiding unit of a motive power transmitting gear according to a third embodiment, FIG. 15 is a schematic diagram illustrating the collision avoiding unit of the motive power transmitting gear according to the third embodiment, and FIG. 16 is a schematic diagram illustrating a collision avoiding unit of a motive power transmitting gear according to a fourth embodiment.

Figure 17:
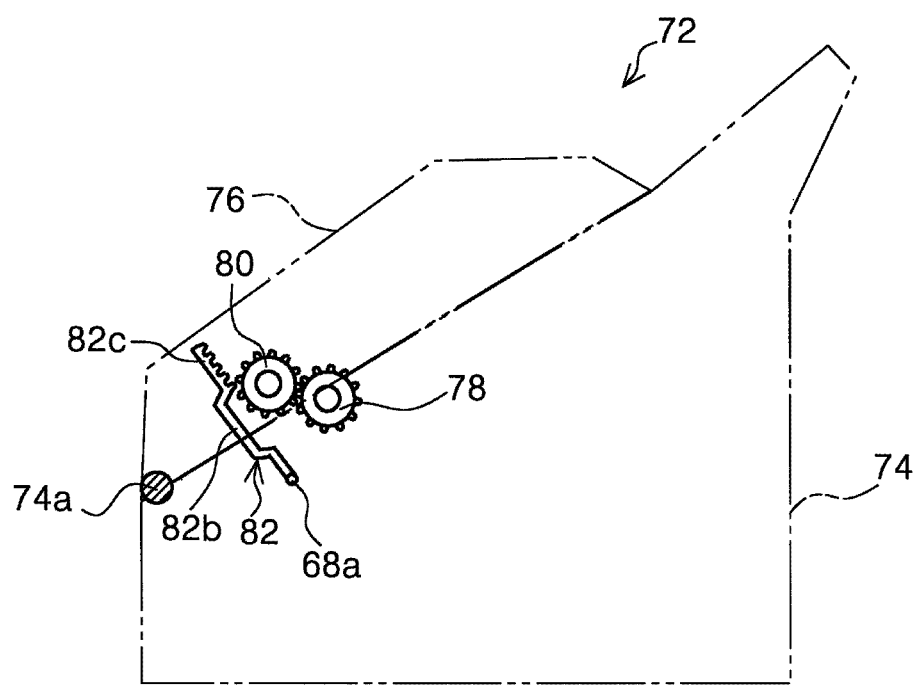
FIG. 17 is a schematic diagram illustrating the collision avoiding unit of the motive power transmitting gear according to the fourth embodiment.
Figure 18:
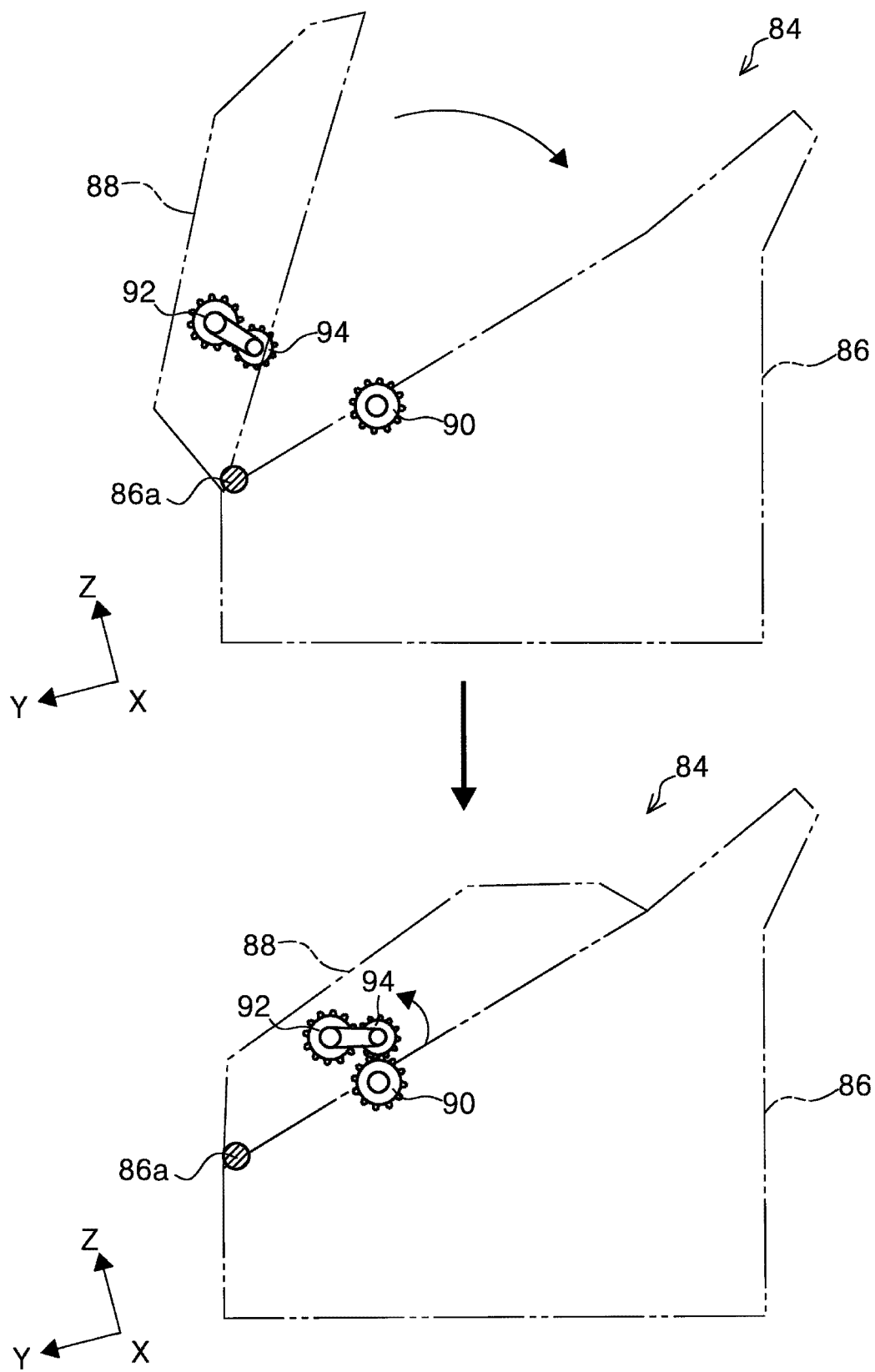
FIG. 18 is a schematic diagram illustrating a collision avoiding unit of a motive power transmitting gear according to a fifth embodiment.
Figure 19:
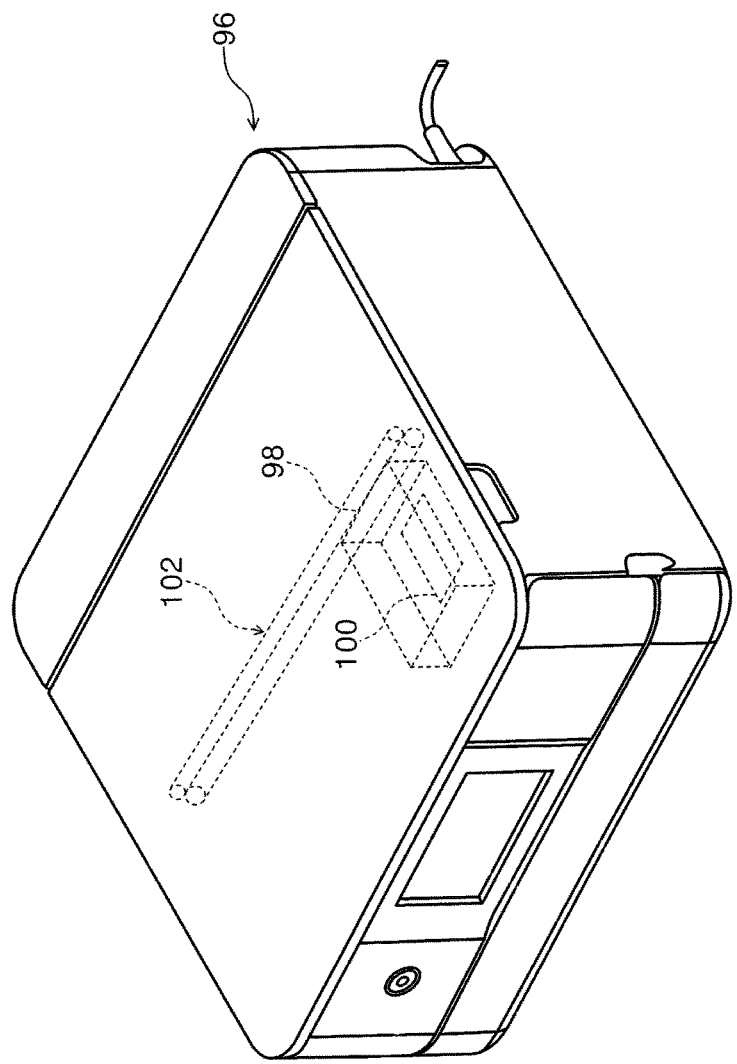
FIG. 19 is a perspective view illustrating the outer appearance of an example of a recording apparatus to which the separation roller according to the first embodiment is applied.

FIG. 17 is a schematic diagram illustrating the collision avoiding unit of the motive power transmitting gear according to the fourth embodiment, FIG. 18 is a schematic diagram illustrating a collision avoiding unit of a motive power transmitting gear according to a fifth embodiment, and FIG. 19 is a perspective view illustrating the outer appearance of an example of a recording apparatus to which the separation roller according to the first embodiment is applied.

In addition, regarding the X-Y-Z coordinate system in each drawing, an X direction is an apparatus width direction and a paper sheet width direction, a Y direction is a paper sheet transportation direction in an image reading apparatus, and a Z direction is a direction orthogonal to the Y direction and a direction approximately orthogonal to a surface of a transported paper sheet. Note that, in each drawing, a +Y direction side is an apparatus front surface side and a −Y direction side is an apparatus rear surface side.

First Embodiment

Image Reading Apparatus

As understood from FIGS. 1 and 2, a scanner 10 is provided with a lower unit 12, an upper unit 14, a medium placement unit 16, and a discharge tray 18. In the present embodiment, the upper unit 14 is attached to the lower unit 12 such that the upper unit 14 can rotate relative to the lower unit 12 with a rotary fulcrum 12a (FIGS. 14 and 15) as a fulcrum, the rotary fulcrum 12a being provided on the downstream side in a paper sheet transportation direction.

A user interface unit 20 is provided on a front surface of the upper unit 14. For example, the user interface unit 20 is configured as a touch panel and functions as both of a display unit and an operation unit. By operating the user interface unit 20, it is possible to execute a medium reading operation or the like of the scanner 10. On a side close to the front surface of the scanner 10, a discharge port 22 is provided below the user interface unit 20. Below the discharge port 22, the discharge tray 18 is provided. In the present embodiment, the discharge tray 18 is configured so as to be able to switch between a state where the discharge tray 18 is accommodated in the lower unit 12 (FIGS. 1 and 2) and a deployed state where the discharge tray 18 is drawn out from the lower unit 12 toward the side close to the front surface of the lower unit 12.

Document Transportation Path

In FIG. 2, a medium transportation path 24 in the scanner 10 will be described. Note that, a thick solid line with a symbol "P" in FIG. 2 illustrates a guidance path of a medium which is transported along the medium transportation path 24 in the scanner 10.

An apparatus rear surface side end portion of the lower unit 12 is provided with the medium placement unit 16. The medium placement unit 16 is configured to be able to support a document in an inclined posture. It is possible to set a plurality of media on the medium placement unit 16. The medium placement unit 16 is provided with a pair of edge guides 16a that can be displaced in a direction in which the edge guides 16a approach to each other or in a direction in which the edge guides 16a are separated from each other and the pair of edge guides 16a is configured to guide a side portion of a medium placed on the medium placement unit 16. Note that, examples of a medium P in the present embodiment include media having different sizes such as an A4 paper sheet, a B5 paper sheet, a photographic paper sheet, and a postcard.

On the path of the medium transportation path 24 in the lower unit 12, a feed roller 26, a separation roller 28, a pair of transportation rollers 30, an image reading section 32 as a "reader", and a pair of discharge rollers 34 are provided in a direction from the upstream side (−Y direction side) to the downstream side (+Y direction side) in a medium transportation direction.

The separation roller 28 is positioned to face the feed roller 26. The separation roller 28 is provided in a state of being urged toward the feed roller 26 by an urging unit (not shown). A medium that is supported by the medium placement unit 16 in an inclined posture is nipped by the feed roller 26 and the separation roller 28 and is transported to the pair of transportation rollers 30 disposed on the downstream side in the transportation direction. Thereafter, the pair of transportation rollers 30 feeds a document fed from the feed roller 26 toward the image reading section 32.

The image reading section 32 is provided with a first reading unit 36A that is provided in the lower unit 12 to face a lower surface (first surface) of a medium transported along the medium transportation path 24 and a second reading unit 36B that is provided in the upper unit 14 to face an upper surface (second surface) of the medium transported along the medium transportation path 24. In the present embodiment, the first reading unit 36A and the second reading unit 36B are configured as a reading unit and for example, the first reading unit 36A and the second reading unit 36B are configured as a contact image sensor module (CISM).

A document that is fed to the image reading section 32 by the pair of transportation rollers 30 is nipped by the pair of discharge rollers 34 positioned on the downstream side of the image reading section 32 in the transportation direction and is discharged via the discharge port 22 after an image on at least one of the first and second surfaces of the medium P is read in the image reading section 32.

Constituent Elements of Image Reading Apparatus

In FIGS. 2 and 3, the constituent elements of the scanner 10 will be further described. In the present embodiment, for example, a controller 38 is provided in the lower unit 12. The controller 38 is configured as an electric circuit provided with a plurality of electric components. In the present embodiment, the controller 38 is configured to control transportation of the medium P in the scanner 10 and an image reading operation. For example, the controller 38 may control an operation that is necessary for executing a medium reading operation in the scanner 10 based on a command from an external device (PC or like).

As illustrated in FIG. 3, the scanner 10 is provided with a feed driving motor 40, a separation driving motor 42, a transportation driving motor 44, and a power source 46. The rotation of each of the motors 40, 42, and 44 is controlled by the controller 38. Specifically, each of the motors 40, 42, and 44 is provided with a rotary scale (not shown) and the rotation of each of the motors 40, 42, and 44 is controlled by the controller 38 based on a value measured by an encoder sensor (not shown) that measures the amount of rotation of the rotary scale.

In the present embodiment, the feed driving motor 40 controls the rotation of the feed roller 26. The separation driving motor 42 controls the rotation of the separation roller 28 and the transportation driving motor 44 controls the rotation of a transportation driving roller 30a and a discharge driving roller 34a. Note that, in the present embodiment, the pair of transportation rollers 30 is provided with the transportation driving roller 30a and a transportation driven roller 30b. The pair of discharge rollers 34 is provided with the discharge driving roller 34a and a discharge driven roller 34b.

The scanner 10 in the present embodiment is provided with a medium placement unit detection sensor 50, a medium feed detection sensor 52, a multi-feeding detection sensor 54 as a "multi-feeding detection unit", and a passage detection sensor 56 as a "passage detection unit" in FIG. 3.

In the present embodiment, the medium placement unit detection sensor 50 is provided in the medium placement unit 16 as illustrated in FIG. 2. For example, the medium placement unit detection sensor 50 is configured as a reflective type optical sensor and is configured to detect a medium set on the medium placement unit 16.

As illustrated in FIG. 2, the medium feed detection sensor 52 is provided on the downstream side of the feed roller 26 and the separation roller 28 in the medium transportation path 24. For example, the medium feed detection sensor 52 is configured as an optical sensor and is provided with a light emitting unit 52a and a light receiving unit 52b. In addition, the light emitting unit 52a and the light receiving unit 52b are positioned to face each other with the medium transportation path 24 interposed therebetween. When the medium P is transported into the medium transportation path 24, the medium P blocks detection light from the light emitting unit 52a and thus the medium P is detected. In addition, the medium feed detection sensor 52 transmits a detection signal to the controller 38 when the medium feed detection sensor 52 detects the medium P.

The medium feed detection sensor 52 in the present embodiment is configured to be able to detect whether the fed medium P is a carrier sheet (not shown) or not, for example. Here, the carrier sheet is a sheet obtained by partially bonding peripheral edge portions of two sheets formed of colorless and transparent synthetic resin. The carrier sheet is transported along the medium transportation path 24 in a state where a booklet such as a passport or a fold-in-half document is interposed between the two sheets and the carrier sheet is used when reading a medium interposed between the two sheets of the carrier sheet in the image reading section 32.

For example, the medium feed detection sensor 52 is configured to read a mark provided on the bonded peripheral portions of the carrier sheet. The medium feed detection sensor 52 detects that the fed medium is a carrier sheet by detecting the mark and transmits a detection signal to the controller 38 (FIGS. 2 and 3) which will be described later. Note that, in a case where the medium feed detection sensor 52 detects a carrier sheet, the controller 38 (FIGS. 2 and 3) nullifies a detection signal from the multi-feeding detection sensor 54.

In the medium transportation path 24 in FIGS. 2 and 3, the multi-feeding detection sensor 54 that detects multi-feeding of the medium P is disposed on the downstream side of the medium feed detection sensor 52 in the transportation direction. In the present embodiment, for example, the multi-feeding detection sensor 54 is configured as an ultrasonic sensor that is provided with a speaker unit 54a provided in the lower unit 12 and a microphone unit 54b provided in the upper unit 14.

In the present embodiment, the multi-feeding detection sensor 54 is configured to emit an ultrasonic wave toward the medium P passing through the medium transportation path 24 from the speaker unit 54a and to detect a reflected sound from the medium P by using the microphone unit 54b. In the present embodiment, the multi-feeding detection sensor 54 is not only able to detect multi-feeding of the medium P but also able to detect the kind of the medium P such as a thick sheet by using the frequency of the reflected sound. The multi-feeding detection sensor 54 transmits a detection signal to the controller 38 (FIGS. 2 and 3) when the multi-feeding detection sensor 54 detects the medium P.

As illustrated in FIG. 2, in the medium transportation path 24, the passage detection sensor 56 is provided on the downstream side of the pair of transportation rollers 30 in the transportation direction. For example, the passage detection sensor 56 is configured as a contact sensor provided with a lever. Here, when the medium P is transported along the medium transportation path 24, the lever of the passage detection sensor 56 is pressed by a leading end of the medium P so that the lever rotates toward the downstream side in the transportation and is displaced to a position (FIG. 2) denoted by a reference numeral "56-1". In this manner, the passage detection sensor 56 detects the medium P. The passage detection sensor 56 transmits a detection signal to the controller 38 when the passage detection sensor 56 detects the medium P.

The controller 38 received the detection signals from the medium placement unit detection sensor 50, the medium feed detection sensor 52, the multi-feeding detection sensor 54, and the passage detection sensor 56 and the controller 38 controls a reading operation of the first reading unit 36A and the second reading unit 36B and the rotation of the feed roller 26, the separation roller 28, the pair of transportation rollers 30, and the pair of discharge rollers 34.

Note that, in the present embodiment, for example, the medium placement unit 16, the feed roller 26, the separation roller 28, the separation driving motor 42, and the controller 38 constitute a medium feeding device 58 (FIG. 2).

In the present embodiment, the controller 38 controls the value of a current supplied to the separation driving motor 42 from the power source 46. Specifically, the controller 38 controls the value of a current supplied to the separation driving motor 42 to control a rotational torque (braking force) to the separation roller 28. Accordingly, in the present embodiment, a rotational torque is applied to the separation roller 28 not via a torque limiter and from the separation driving motor 42 to the separation roller 28 and media are separated by the separation roller 28 to which the rotational torque is applied.

Specifically, the value of a current to the separation driving motor 42 is set such that the rotational torque (braking force) of the separation roller 28 becomes smaller than the rotational torque (medium transporting force) of the feed roller 26 and larger than a frictional force between media, which will be described later.

In the present embodiment, for example, when the scanner 10 is turned on, the controller 38 starts supply of power to the separation driving motor 42 from the power source 46. In an upper drawing of FIG. 4, the feed roller 26 is in a non-feeding state, that is, a state of not rotating. In this state, since the rotational torque of the separation roller 28 is smaller than the rotational torque of the feed roller 26, the separation roller 28 cannot rotate in a direction (counterclockwise direction in upper drawing of FIG. 4) in which the medium P is returned to the upstream side of the feed roller 26 in the transportation direction.

Here, when the feed roller 26 starts to rotate in a feeding direction (counterclockwise direction in lower drawing of FIG. 4), since the rotational torque of the separation roller 28 is smaller than the rotational torque of the feed roller 26, the separation roller 28 starts to rotate in a direction in which the medium P is fed to the downstream side in the transportation direction in accordance with the rotation of the feed roller 26.

As illustrated in the lower drawing in FIG. 4, when the feed roller 26 starts to feed the medium P, the medium P is nipped by the feed roller 26 and the separation roller 28 and the separation roller 28 and the medium P abut onto each other. In this state, due to a frictional force generated between the separation roller 28 and the medium P, the rotational torque of the feed roller 26 is transmitted to the separation roller 28 through the nipped medium P. Here, the rotational torque (braking force) of the separation roller 28 is set to be smaller than the rotational torque (medium transporting force) of the feed roller 26. As a result, in this state also, the separation roller 28 rotates in a direction in which the medium P is fed to the downstream side in the feeding direction in accordance with the rotation of the feed roller 26.

As illustrated in the upper drawing of FIG. 5, there is a case where a leading end of a medium P2 enters a space between the feed roller 26 and the separation roller 28 along with a medium P1 by being accompanied by the medium P1. In this case, a frictional force is generated between the medium P1 and the medium P2. Here, in the present embodiment, the rotational torque (braking force) of the separation roller 28 is set to be larger than the frictional force generated between the medium P1 and the medium P2.

Therefore, as illustrated in the upper and lower drawings of FIG. 5, the separation roller 28 rotates in a direction in which the medium P is returned to the upstream side in the transportation direction and the medium P2 entering the space between the feed roller 26 and the separation roller 28 is returned to the upstream side in the feeding direction. As a result, multi-feeding can be suppressed.

Next, as illustrated in the upper drawing of FIG. 6, there is a case where a plurality of media enter the space between the feed roller 26 and the separation roller 28 in addition to the medium P1. The upper drawing of FIG. 6 illustrates an example where the medium P2 and a medium P3 enter the space between the feed roller 26 and the separation roller 28. In this case also, a frictional force is generated between the medium P1 and the medium P2 and between the medium P2 and the medium P3.

In the upper drawing of FIG. 6, when the medium P2 and the medium P3 enter the space between the feed roller 26 and the separation roller 28, the separation roller 28 starts to rotate in a direction in which the medium P is returned to the upstream side in the transportation direction. At this time, there is a case where a leading end of the medium P2 reaches the multi-feeding detection sensor 54, which is positioned on the downstream side of the feed roller 26, along with the medium P1 before the separation roller 28 returns the medium P3 to the upstream side in the transportation direction and thus the medium P2 is detected by the multi-feeding detection sensor 54. Accordingly, the controller 38 determines that there is multi-feeding based on detection information from the multi-feeding detection sensor 54.

As a result, in order to fix the multi-feeding, the controller 38 continues supply of power to the separation driving motor 42 so as to cause the separation roller 28 to continue to rotate in a direction in which the medium P is returned to the upstream side in the transportation direction. Accordingly, the separation roller 28 comes into contact with the medium P2 after returning the medium P3 to the upstream side in the feeding direction and thus the medium P2 is also pressed and returned to the upstream side in the feeding direction. Therefore, the possibility of multi-feeding can be decreased or suppressed.

In FIG. 2, in a case where the medium P is fed, if a leading end of the medium P does not reach the passage detection sensor 56 and the passage detection sensor 56 does not enter a detection state until a predetermined period of time elapses after the rotation of the feed roller 26 is started, the controller 38 performs control such that the value of a current applied to the separation driving motor 42 becomes small.

Accordingly, the rotational torque (braking force) of the separation roller 28 becomes small and it becomes easy to feed the medium P to the downstream side in the feeding direction. Therefore, non-feeding of the medium P can be fixed. Note that, for example, the predetermined period of time in the present embodiment is set as a passage time that is obtained by dividing the length of a path between a nip position between the feed roller 26 and the separation roller 28 and a detection position of the passage detection sensor 56 by a medium feeding speed of the feed roller 26.

Control of Separation Roller During Medium Feeding

Next, in FIG. 7, control of the separation roller 28 at the time of feeding the medium P will be described. The controller 38 causes the feed roller 26 to start to rotate and starts a reading job of reading the medium P according to input to the user interface unit 20 or an external input signal from a PC or the like connected to the scanner 10 (Step S1).

First, the controller 38 determines whether the type of the medium P to be read is a cut sheet or not (Step S2). Specifically, the controller 38 causes a user to select whether the type of the medium P to be subject to a reading (scanning) job is a cut sheet or is not a cut sheet through the user interface unit 20, the PC, or the like. In a case where the medium P to be subject to the reading job is a cut sheet, the controller 38 proceeds to Step S3.

Meanwhile, in a case where the medium P to be subject to the reading job is not a cut sheet, that is, in a case where it is not necessary for the separation roller 28 to perform the separation, the controller 38 proceeds to Step S4. In Step S4, the controller 38 stops supply of power to the separation driving motor 42 such that application of a rotational torque to the separation roller 28 is stopped such that the separation roller 28 rotates in accordance with the rotation of the feed roller 26 or causes the separation roller 28 to rotate in a direction in which the medium P is fed to the downstream side in the feeding direction.

In the present embodiment, in a case where the application of a rotational torque to the separation roller 28 is stopped such that the separation roller 28 rotates in accordance with the rotation of the feed roller 26, a load that acts on the medium P when the medium P is fed to the downstream side in the feeding direction can be made small and thus the medium P can be smoothly fed to the downstream side in the feeding direction.

Meanwhile, in a case where the separation roller 28 is caused to rotate in a direction in which the medium P is fed to the downstream side in the feeding direction, the separation roller 28 can assist the feeding of the medium P to the downstream side in the feeding direction and thus the medium P can be smoothly fed to the downstream side in the feeding direction.

In Step S3, the controller 38 determines whether multi-feeding has occurred or not at a time when the medium P is fed in a previous feeding operation before the current reading job or during the current reading job based on past history information stored in a storage unit (not shown) provided in the controller 38. In a case where the controller 38 determines that multi-feeding has occurred in the previous feeding operation based on the history information, the controller 38 increases the value of a current applied to the separation driving motor 42 such that the rotational torque of the separation roller 28 becomes large (Step S5).

In a case where the controller 38 determines that multi-feeding has not occurred in the previous feeding operation based on the history information, the controller 38 sets the value of a current applied to the separation driving motor 42 to a predetermined value such that the rotational torque of the separation roller 28 reaches a prescribed value (Step S6). Based on the rotational torque of the separation roller 28 set in Step S5 or Step S6, the controller 38 causes the medium P to be fed toward the downstream side in the feeding direction (Step S7).

The controller 38 monitors whether there is multi-feeding with the multi-feeding detection sensor 54 in the medium transportation path 24 (Step S8). In a case where the multi-feeding detection sensor 54 detects multi-feeding of the medium P, the controller 38 continues to drive the separation driving motor 42 so as to rotate the separation roller 28 in a direction in which the medium P is returned to the upstream side in the feeding direction (step S9). Accordingly, the separation roller 28 rotates in a direction in which the medium P is returned to the upstream side in the feeding direction so that the medium P being multi-fed is returned to the upstream side in the feeding direction. When the medium P being multi-fed is returned to the upstream side in the feeding direction, the separation roller 28 comes into contact with the feed roller 26 or the medium P fed by the feed roller 26 and stops the rotation.

In a case where multi-feeding detection sensor 54 does not detect multi-feeding or in a case where the medium P is fed to the image reading section 32 through Step S4, the controller 38 causes the image reading section 32 to execute a reading job of reading (scanning) the medium P (Step S10).

The controller 38 determines whether the reading job of reading the medium P in the image reading section 32 is finished or not (Step S11). In a case where it is determined that the reading job of reading (scanning) the medium P in the image reading section 32 is not finished, the operation in Step S3 and the subsequent operations are repeated. In the present embodiment, while the medium P set on the medium placement unit 16 is detected by the medium placement unit detection sensor 50, the controller 38 determines that the medium P to be subject to the reading (scanning) job is present and continues the reading job of reading the medium P. In a case where it is determined that the reading job of reading (scanning) the medium P is finished, the medium P is discharged through the discharge port 22 and the reading operation of reading the medium P is finished.

In the present embodiment, since the separation roller 28 is driven independently by the separation driving motor 42 not via a torque limiter, a load on the transportation driving motor 44 can be decreased in comparison with a configuration in which the separation roller 28 is driven by the transportation driving motor 44. Furthermore, in the present embodiment, it is possible to arbitrarily set the rotational torque (braking force) of the separation roller 28 by using the value of a current applied to the separation driving motor 42 and thus it is possible to improve the degree of freedom in setting the torque of the separation roller 28.

More specifically, in a case where a medium resulting in a high inter-medium frictional force is fed, the value of a current applied to the separation driving motor 42 is increased such that the rotational torque (braking force) of the separation roller 28 is increased and in a case where a medium that is easy to be folded such as a thin sheet is fed, the value of a current applied to the separation driving motor 42 is decreased such that the rotational torque (braking force) of the separation roller 28 is decreased.

The separation driving motor 42 in the present embodiment is provided with the rotary scale (not shown) and the encoder sensor that measures the amount of rotation of the rotary scale. Multi-feeding of the medium may be detected by using this configuration. For example, in a case where there is no multi-feeding, the separation roller 28 does not rotate and thus the amount of rotation of the rotary scale (not shown) is not detected. However, in a case where there is multi-feeding, the separation driving motor 42 is driven to return the medium to the upstream side in the feeding direction and thus the amount of rotation of the rotary scale is detected. As a result, multi-feeding can be detected before the multi-feeding detection sensor 54 detects the multi-feeding. The medium P may be returned to the upstream side in the feeding direction earlier when the amount of rotation is detected.

Modification Example of First Embodiment

The separation roller 28 and the separation driving motor 42 in the present embodiment may also be applied to a printer 96 as a "recording apparatus" illustrated in FIG. 19 instead of the scanner. The printer 96 is provided with a carriage 98 that is movable in the apparatus width direction. A lower portion of the carriage 98 is provided with a recording head 100 as a "recording unit". The recording head 100 is configured to be able to discharge ink toward the medium P. The printer 96 is provided with a pair of transportation rollers 102. The pair of transportation rollers 102 is configured to feed the medium P to a region facing the recording head 100. In the present embodiment, the separation roller 28 in the present embodiment is provided between a medium accommodating unit (not shown) provided in the printer 96 and the pair of transportation rollers 102 in a medium transportation path.

Second Embodiment

Control Circuit

In FIGS. 8 and 9, the second embodiment will be described. In the present embodiment, a control circuit 48 that controls supply of power from the power source 46 to the separation driving motor 42 is provided. For example, the control circuit 48 is controlled by the controller 38. The control circuit 48 is configured as an electric circuit that controls supply of power from the power source 46 to the separation driving motor 42 in the upper drawing of FIG. 8. For example, the control circuit 48 is provided with the power source 46, the separation driving motor 42, a first switch SW1, a second switch SW2, a third switch SW3, and a variable resistor VR. In the present embodiment, the power source 46 is configured as a direct current (DC) power source, for example.

The control circuit 48 is configured as a circuit that supplies power to the separation driving motor 42 from the power source 46. The first switch SW1 is provided between the power source 46 and the separation driving motor 42. By switching contact points of the first switch SW1, it is possible to switch between a first circuit state (upper drawing of FIG. 8), in which a closed circuit that includes the power source 46 is configured and the separation driving motor 42 can be driven to rotate with power supplied to the separation driving motor 42 from the power source 46, and a second circuit state (lower drawing of FIG. 8), in which a closed circuit that includes the variable resistor VR but does not include the power source 46 is configured and power is not supplied to the separation driving motor 42 from the power source 46. The controller 38 controls the switching between the contact points of the first switch SW1.

The second switch SW2 and the third switch SW3 are configured such that contact points of the second switch SW2 and contact points of the third switch SW3 can be switched in conjunction with each other with the second switch SW2 and the third switch SW3 controlled by the controller 38. The controller 38 can reverse the polarity of a current flowing to the separation driving motor 42 from the power source 46 by switching the contact points of the switch SW2 and the contact points of the third switch SW3 in conjunction with each other. In the present embodiment, the controller 38 is configured to be able to arbitrarily set the resistance value of the variable resistor VR.

In the upper drawing of FIG. 8, an anode (+ side electrode) of the power source 46 is connected to the separation driving motor 42 via the third switch SW3 and a cathode (− side electrode) of the power source 46 is connected to the separation driving motor 42 via the first switch SW1 and the second switch SW2. The above described state is the first circuit state of the control circuit 48. In the first circuit state, power is supplied to the separation driving motor 42 from the power source 46 and the separation driving motor 42 rotates. In the first circuit state in the present embodiment, the separation driving motor 42 rotates the separation roller 28 in a direction (counterclockwise direction in FIG. 2) in which the medium P is returned to the upstream side in the medium transportation direction in FIG. 2.

In the lower drawing of FIG. 8, when the controller 38 switches the contact point of the first switch SW1 to a contact point on the variable resistor VR side from a contact point on the power source 46 side, supply of power from the power source 46 to the separation driving motor 42 is stopped. In this state, the control circuit 48 becomes a closed circuit that includes the separation driving motor 42 and the variable resistor VR and enters the second circuit state. In the second circuit state, a load (braking force) corresponding to the resistance value of the variable resistor VR acts on the separation driving motor 42.

Specifically, when the resistance value of the variable resistor VR is decreased, a torque for rotating a rotary shaft of the separation driving motor 42 from the outside is increased and when the resistance value of the variable resistor VR is increased, a torque for rotating the rotary shaft of the separation driving motor 42 from the outside is decreased. Therefore, when the resistance value of the variable resistor VR is decreased, the rotational torque of the separation roller 28 is increased and when the resistance value of the variable resistor VR is increased, the rotational torque of the separation roller 28 is decreased. When the rotational torque of the separation roller 28 is increased, the separating ability is improved. However, non-feeding becomes likely to occur. When the rotational torque of the separation roller 28 is decreased, the separating ability is decreased. However, non-feeding becomes less likely to occur.

The upper drawing of FIG. 9 illustrates the first circuit state. When the controller 38 switches the contact points of the second switch SW2 and the contact points of the third switch SW3 in conjunction with each other in this state (lower drawing of FIG. 9), a current that flows to the separation driving motor 42 from the power source 46 starts to flow in the opposite direction. Specifically, in the upper drawing of FIG. 9, a current flows in a clockwise direction in FIG. 9. When the controller 38 switches the contact points of the second switch SW2 and the contact points of the third switch SW3, the current flows in a counterclockwise direction in FIG. 9. As a result, the rotation direction of the separation driving motor 42 is reversed.

Specifically, in the lower drawing of FIG. 9, since the rotation direction of the separation driving motor 42 is reversed, the rotation direction of the separation roller 28 is also reversed. In other words, in a circuit state as illustrated in the lower drawing of FIG. 9, the separation roller 28 rotates in a direction (clockwise direction in FIG. 2) in which the medium P set on the medium placement unit 16 is fed to the downstream side from the upstream side in the medium feeding direction. Note that, the circuit state as illustrated in the lower drawing of FIG. 9 is the third circuit state of the control circuit 48.

Operation of Separation Roller During Medium Feeding

Next, in FIGS. 10 to 12, the operation of the separation roller 28 at the time of feeding the medium P will be described. First, in FIG. 10, a feeding operation in a state where one medium P is set on the medium placement unit 16 will be described. In the upper drawing of FIG. 10, the control circuit 48 is in the second circuit state. In the second circuit state, the resistance value of the variable resistor VR is set to a prescribed value set in advance. In the present embodiment, the prescribed value of the resistance value is set to a value smaller than the rotational torque of the feed roller 26.

When the medium P set on the medium placement unit 16 starts to be fed, the feed roller 26 starts to rotate and the medium P is fed to the downstream side in the medium feeding direction. In the upper drawing of FIG. 10, since the rotational torque (braking force) of the separation roller 28 is set to be smaller than the rotational torque of the feed roller 26, in a state where the separation roller 28 abuts onto the feed roller 26, the separation roller 28 is rotated in a direction in which the medium P is fed to the downstream side in the feeding direction in accordance with the rotation of the feed roller 26.

In the lower drawing of FIG. 10, when the medium P is nipped by the feed roller 26 and the separation roller 28, the separation roller 28 comes into contact with the medium P. In this state, due to a frictional force generated between the separation roller 28 and the medium P, the rotational torque of the feed roller 26 is transmitted to the separation roller 28 through the nipped medium P. Here, the rotational torque (braking force) of the separation roller 28 is set to be smaller than the rotational torque (medium transporting force) of the feed roller 26. As a result, in this state also, the separation roller 28 rotates in a direction in which the medium P is fed to the downstream side in the feeding direction in accordance with the rotation of the feed roller 26.

Next, a state illustrated in the upper drawing of FIG. 11 is a state where a plurality of media P are set on the medium placement unit 16. When the plurality of media P set on the medium placement unit 16 start to be fed and the feed roller 26 starts to rotate in this state, leading ends of the plurality of media P come into contact with the separation roller 28. Accordingly, a frictional force is generated between the separation roller 28 and the leading ends of the plurality of media P. The frictional force acts such that the rotation of the separation roller 28 is hindered.

As a result, in the upper drawing of FIG. 11, since the sum of the rotational torque of the separation roller 28 and the frictional force is larger than the rotational torque of the feed roller 26, the rotation of the separation roller 28 is hindered even when the rotation of the feed roller 26 is started. When the feeding of the medium P is started as in the upper drawing of FIG. 11, a transportation force from the feed roller 26 is applied to the medium P being in contact with the feed roller 26 (lowermost medium) and the medium P is fed to the downstream side in the feeding direction. Meanwhile, the media P other than the lowermost medium are held back by the separation roller 28 and are not fed to the downstream side in the feeding direction. In this manner, the plurality of media P are separated by the separation roller 28.

However, as in the lower drawing of FIG. 11, when the plurality of media P are fed, the plurality of media P may enter a space between the feed roller 26 and the separation roller 28. For example, in the lower drawing of FIG. 11, in a case where the media P2 and P3 enter the space between the feed roller 26 and the separation roller 28, the medium P1 is in contact with the feed roller 26, a lower surface of the medium P2 is in contact with the medium P1, a lower surface of the medium P2 is in contact with the medium P3, and the medium P3 is in contact with the separation roller 28.

The lower drawing of FIG. 11 illustrates a state in which, the medium P1 is fed to the downstream side in the feeding direction by the feed roller 26, the medium P3 is held back by the separation roller 28, and the medium P2 is fed to the downstream side along with the medium P1 moving toward the downstream side in the feeding direction due to a frictional force between the medium P2 and the medium P1, that is, a multi-feeding state. Hereinafter, forces acting on the media will be described. The medium P1 is fed to the downstream side in the feeding direction while receiving the transportation force from the feed roller 26. Here, the medium P2 receives the frictional force generated between the medium P1 and the medium P2 and the frictional force generated between the medium P2 and the medium P3. Since the medium P2 also receives the transportation force from the feed roller 26 via the medium P1, when the sum of the frictional force between the medium P1 and the medium P2 and the transportation force of the feed roller 26 becomes larger than the frictional force between the medium P2 and the medium P3, the medium P2 is fed to the downstream side in the feeding direction along with the medium P1 and enters the multi-feeding state by being fed to the downstream side in the feeding direction together with the medium P1.

Here, the medium P3 is in contact with the separation roller 28. A rotational torque according to a prescribed resistance value (prescribed value) of the variable resistor VR of the control circuit 48 acts on the separation roller 28 and the magnitude of the braking force of the separation roller 28 generated due to the rotational torque is set such that the braking force exceeds a force with which the medium P2 rotates the separation roller 28 via the medium P3 by using the frictional force between the medium P2 and the medium P3. As a result, the separation roller 28 does not rotate and the medium P3 is held back and thus the feeding of the medium P3 toward the downstream side in the feeding direction is hindered.

As illustrated in the upper drawing of FIG. 12, in a case where there is multi-feeding at the time of feeding the media P, it is detected that there is multi-feeding when leading ends of the media P being multi-fed reach the detection position of the multi-feeding detection sensor 54. In the upper drawing of FIG. 12, when the leading ends of the medium P1 and the medium P2 reach the detection position of the multi-feeding detection sensor 54, the multi-feeding detection sensor 54 detects the medium P1 and the medium P2. When it is determined that there is multi-feeding of the media P, the controller 38 switches the circuit state of the control circuit 48 to the first circuit state from the second circuit state.

As a result, in the control circuit 48, power is supplied to the separation driving motor 42 from the power source 46 and the separation roller 28 starts to rotate in a direction in which the medium P is returned to the upstream side in the feeding direction as illustrated in the lower drawing of FIG. 12. Here, the controller 38 causes the separation driving motor 42 to rotate by at least a rotation amount that corresponds to the length of a path from a nip point position between the feed roller 26 and the separation roller 28 to the detection position of the multi-feeding detection sensor 54 in the medium transportation path 24. As a result, even when the leading ends of the medium P2 and the medium P3 are fed to a position that is on the downstream side of a nip point between the feed roller 26 and the separation roller 28 in the feeding direction due to multi-feeding, the medium P2 and the medium P3 can be returned to a position on the upstream side of the nip point. Meanwhile, the lowermost medium P1 is fed to the downstream side in the medium feeding direction regardless of the rotation of the separation roller 28.

Accordingly, since it is possible to reduce the degree of multi-feeding or to fix multi-feeding by rotating the separation roller 28 in a direction in which the medium P is returned to the upstream side in the medium feeding direction when there is multi-feeding in the scanner 10, it is possible to suppress a jam (paper jam) in the scanner 10.

In the present embodiment, in a case where multi-feeding occurs and the medium P is returned by the separation roller 28 to a position on the upstream side of the nip point between the feed roller 26 and the separation roller 28 in the feeding direction, the controller 38 performs control such that the resistance value of the variable resistor VR of the control circuit 48 in the second circuit state becomes smaller than the prescribed value when the medium P is fed next. Therefore, the braking force of the separation roller 28 is increased and the possibility of multi-feeding of the medium P can be suppressed or decreased.

In FIG. 2, in a case where the medium P is fed, if a leading end of the medium P does not reach the passage detection sensor 56 and the passage detection sensor 56 does not enter a detection state until a predetermined period of time elapses after the rotation of the feed roller 26 is started, the controller 38 performs control such that the resistance value of the variable resistor VR of the control circuit 48 in the second circuit state is increased.

Accordingly, the braking force of the separation roller 28 becomes small and it becomes easy to feed the medium P to the downstream side in the feeding direction. Therefore, non-feeding of the medium P can be fixed. Note that, for example, the predetermined period of time in the present embodiment is set as a passage time that is obtained by dividing the length of a path between a nip position between the feed roller 26 and the separation roller 28 and the detection position of the passage detection sensor 56 by a medium feeding speed of the feed roller 26.

Control of Separation Roller During Medium Feeding

Next, in FIG. 13, control of the separation roller 28 at the time of feeding medium P will be described. The controller 38 causes the feed roller 26 to start to rotate and starts a reading job of reading the medium P according to input to the user interface unit 20 or an external input signal from a PC or the like connected to the scanner 10 (Step S12).

First, the controller 38 determines whether the type of the medium P to be read is a cut sheet or not (Step S13). Specifically, the controller 38 causes a user to select whether the type of the medium P to be subject to a reading (scanning) job is a cut sheet or is not a cut sheet through the user interface unit 20, the PC, or the like. In a case where the medium P to be subject to the reading job is a cut sheet, the controller 38 sets the state of the control circuit 48 to the second circuit state (Step S14). That is, the controller 38 sets the state of the control circuit 48 to a state in which the braking force of the separation roller 28 is generated.

Meanwhile, in a case where the medium P to be subject to the reading job is not a cut sheet, that is, in a case where it is not necessary for the separation roller 28 to perform the separation, the controller 38 proceeds to Step S15. In Step S15, the controller 38 sets the state of the control circuit 48 to the second circuit state and maximizes the resistance value of the variable resistor VR or sets the state of the control circuit 48 to the third circuit state and rotates the separation roller 28 in a direction in which the medium P is fed to the downstream side in the feeding direction.

In a case where the resistance value of the variable resistor VR is maximized after the state of the control circuit 48 is set to the second circuit state, the braking force acting on the separation roller 28 can be minimized. Accordingly, a load that acts on the medium P when the medium P is fed to the downstream side in the feeding direction can be made small and thus the medium P can be smoothly fed to the downstream side in the feeding direction.

Meanwhile, in a case where the state of the control circuit 48 is set to the third circuit state and the separation roller 28 is caused to rotate in a direction in which the medium P is fed to the downstream side in the feeding direction, the separation roller 28 can assist the feeding of the medium P to the downstream side in the feeding direction and thus the medium P can be smoothly fed to the downstream side in the feeding direction.

After the state of the control circuit 48 is set to the second circuit state (Step S14), the controller 38 determines whether multi-feeding has occurred or not at a time when the medium P is fed in a previous feeding operation before the current reading job or during the current reading job (Step S16) based on past history information stored in a storage unit (not shown) provided in the controller 38. In a case where the controller 38 determines that multi-feeding has occurred in the previous feeding operation based on the history information, the controller 38 decreases the resistance value of the variable resistor VR of the control circuit 48 from the prescribed value (Step S17) such that the braking force of the separation roller 28 is increased.

In a case where the controller 38 determines that multi-feeding has not occurred in the previous feeding operation based on the history information, the controller 38 sets the resistance value of the variable resistor VR of the control circuit 48 to the prescribed value (Step S18). Based on the resistance value of the variable resistor VR set in Step S17 or Step S18, the controller 38 causes the medium P to be fed toward the downstream side in the feeding direction (Step S19).

The controller 38 monitors whether there is multi-feeding with the multi-feeding detection sensor 54 in the medium transportation path 24 (Step S20). In a case where the multi-feeding detection sensor 54 detects multi-feeding of the medium P, the state of the control circuit 48 is switched from the second circuit state to the first circuit state (Step S21). Accordingly, the separation roller 28 rotates in a direction in which the medium P is returned to the upstream side in the feeding direction so that the medium P being multi-fed is returned to the upstream side in the feeding direction. After the separation driving motor 42 is rotated by a rotation amount that corresponds to the length of a path from the nip point position between the feed roller 26 and the separation roller 28 and the detection position of the multi-feeding detection sensor 54, the controller 38 switches the state of the control circuit 48 from the first circuit state to the second circuit state (Step S14).

In a case where multi-feeding detection sensor 54 does not detect multi-feeding or in a case where the medium P is fed to the image reading section 32 through Step S15, the controller 38 causes the image reading section 32 to execute a reading job of reading (scanning) the medium P (Step S22).

The controller 38 determines whether the reading job of reading the medium P in the image reading section 32 is finished or not (Step S23). In a case where it is determined that the reading job of reading (scanning) the medium P in the image reading section 32 is not finished, the operation in Step S14 and the subsequent operations are repeated. In the present embodiment, while the medium P set on the medium placement unit 16 is detected by the medium placement unit detection sensor 50, the controller 38 determines that the medium P to be subject to the reading (scanning) job is present and continues the reading job of reading the medium P. In a case where it is determined that the reading job of reading (scanning) the medium P is finished, the medium P is discharged through the discharge port 22 and the reading operation of reading the medium P is finished.

In the present embodiment, since the separation roller 28 is driven independently by the separation driving motor 42, a load on the transportation driving motor 44 can be decreased in comparison with a configuration in which the separation roller 28 is driven by the transportation driving motor 44. Furthermore, in the present embodiment, it is possible to arbitrarily set the rotational torque (braking force) of the separation roller 28 by using the resistance value of the variable resistor VR and thus it is possible to improve the degree of freedom in setting the torque of the separation roller 28.

More specifically, in a case where a medium resulting in a high inter-medium frictional force is fed, the resistance value of the variable resistor VR is made smaller than the prescribed value such that the braking force of the separation roller 28 becomes large and in a case where a medium that is easy to be folded such as a thin sheet is fed, the resistance value of the variable resistor VR is made larger than the prescribed value such that the braking force of the separation roller 28 becomes weak.

The separation driving motor 42 in the present embodiment is provided with the rotary scale (not shown) and the encoder sensor that measures the amount of rotation of the rotary scale. Multi-feeding of the medium may be detected by using this configuration. For example, in a case where there is no multi-feeding, the separation roller 28 does not rotate and thus the amount of rotation of the rotary scale (not shown) is not detected. However, in a case where there is multi-feeding, the separation driving motor 42 is driven to return the medium to the upstream side in the feeding direction and thus the amount of rotation of the rotary scale is detected. The medium P may be returned to the upstream side in the feeding direction earlier when the amount of rotation is detected.

Modification Example of Second Embodiment (1) In the present embodiment, the control circuit 48 causes the medium P to be fed based on the resistance value set in Step S17 or Step S18 when the reading job of reading the medium P in the image reading section 32 is started. Instead of this, the resistance value of the variable resistor VR may be made larger than a set resistance value or be maximized such that the braking force of the separation roller 28 is minimized at a time when the reading (scanning) job of reading the medium P in the image reading section 32 is started and the state of the control circuit 48 may be switched from the second circuit state to the third circuit state such that the separation roller 28 is rotated in a direction in which the medium P is fed to the downstream side in the feeding direction at a time when the reading (scanning) job of reading the medium P in the image reading section 32 is started.

(2) When the state of the control circuit 48 is switched to the third circuit state such that the separation roller 28 is rotated in a direction in which the medium P is fed to the downstream side in the feeding direction during the reading (scanning) job of reading the medium P in the image reading section 32, the medium transporting speed of the feed roller 26 and the separation roller 28 may be set to be higher than the medium transporting speed of the pair of transportation rollers 30. When the speeds are set as described above, a transportation load for the medium P can be decreased.

(3) In the present embodiment, the second circuit state of the control circuit 48 may be maintained by an external input signal from an external machine such as a PC and any of the first circuit state, the second circuit state, and the third circuit state of the control circuit 48 may be switchable or maintained by the external input signal.

Third Embodiment

Collision Avoiding Unit of Motive Power Transmitting Gear

A collision avoiding unit according to the third embodiment will be described in FIGS. 14 and 15. The upper unit 14 is configured to be able to rotate relative to the lower unit 12 with the rotary fulcrum 12a as a fulcrum. In the present embodiment, in the lower unit 12, many motive power sources such as the feed driving motor 40, the separation driving motor 42, and the transportation driving motor 44 are disposed. Meanwhile, in the upper unit 14, for example, the separation roller 28 that rotates by receiving motive power from the separation driving motor 42 is provided.

In the present embodiment, a motive power transmission path 60 that can switch between a motive power transmission state in which motive power is transmitted to the upper unit 14 from the lower unit 12 and a non-motive power transmission state in which motive power is not transmitted to the upper unit 14 from the lower unit 12 in accordance with the rotation of the upper unit 14 relative to the lower unit 12 is provided. The motive power transmission path 60 is provided with a motive power transmitting gear 62 provided on the lower unit 12 side and a motive power transmitting gear 64 provided on the upper unit 14 side.

A state in which the upper unit 14 is open (rotated) with respect to the lower unit 12 and the motive power transmitting gear 62 and the motive power transmitting gear 64 are separated from each other as illustrated in the upper drawing of FIG. 14 is the non-motive power transmission state. Meanwhile, a state in which the upper unit 14 is closed with respect to the lower unit 12 and the motive power transmitting gear 62 and the motive power transmitting gear 64 mesh with each other as illustrated in FIG. 15 is the motive power transmission state.

Here, when the upper unit 14 is rotated such that the state of the upper unit 14 is switched from an open state to a closed state, teeth of the motive power transmitting gear 62 and teeth of the motive power transmitting gear 64 collide with each other without properly meshing with each other and the teeth of the gears are damaged in the worst case.

In the present embodiment, a collision avoiding unit 66 that prevents the collision between the teeth of the motive power transmitting gear 62 and the teeth of the motive power transmitting gear 64 is provided. The collision avoiding unit 66 is provided with a gear rotation member 68 provided in the lower unit 12 and an engaging member 70 provided in the upper unit 14. In the present embodiment, the gear rotation member 68 is provided with a rotary fulcrum 68a, a gear rotation portion 68b that extends from the rotary fulcrum 68a and that is provided with a rack-shaped portion on a tip end portion thereof, and an engaged portion 68c provided to extend from the rotary fulcrum 68a.

Note that, although not shown, the rotary fulcrum 68a of the gear rotation member 68 is pulled toward the lower unit 12 with the rotary fulcrum 68b as a fulcrum (in counter-clockwise direction around rotary fulcrum 68a in upper drawing of FIG. 14) by a pulling unit (not shown) that is configured with a tension spring, for example. The engaging member 70 is curved and extends toward the lower unit 12 from a lower portion of the upper unit 14.

When the upper unit 14 is rotated toward the lower unit 12 side in a state as illustrated in the upper drawing of FIG. 14, as illustrated in the lower drawing of FIG. 14, the engaging member 70 comes into contact with the engaged portion 68c of the gear rotation member 68. Furthermore, when the upper unit 14 is rotated toward the lower unit 12 side, the engaging member 70 presses the engaged portion 68c in a −Z direction against a pulling force of the pulling unit (not shown). Therefore, the gear rotation member 68 rotates in the clockwise direction in the lower drawing of FIG. 14 with the rotary fulcrum 68a as a fulcrum.

Here, when the upper unit 14 is rotated toward the lower unit 12, the motive power transmitting gear 64 is also rotated in accordance with the rotation of the upper unit 14. Therefore, the motive power transmitting gear 64 is rotated toward the lower unit 12 side and meshes with the rack-shaped portion of the gear rotation portion 68b of the gear rotation member 68. As a result, the motive power transmitting gear 64 meshes with the rack-shaped portion of the gear rotation portion 68b and rotates.

Therefore, when the upper unit 14 is rotated toward the lower unit 12 side such that the upper unit 14 is closed, the motive power transmitting gear 64 comes into contact with the motive power transmitting gear 62 while rotating at a low speed. Accordingly, contact between tip ends of the teeth of the gears can be prevented and the motive power transmitting gear 62 and the motive power transmitting gear 64 can more smoothly mesh with each other. In addition, in a state where the upper unit 14 is closed with respect to the lower unit 12, since the rack-shaped portion of the gear rotation portion 68b is provided only on the tip end portion thereof, the motive power transmitting gear 64 and the rack-shaped portion of the gear rotation portion 68b do not mesh with each other. As a result, in a state where the upper unit 14 is closed with respect to the lower unit 12, the gear rotation member 68 does not hinder transmission of motive power from the motive power transmitting gear 62 to the motive power transmitting gear 64.

Fourth Embodiment

A collision avoiding unit according to the fourth embodiment will be described in FIGS. 16 and 17. In a scanner 72, an upper unit 76 is configured to be able to rotate relative to a lower unit 74 with a rotary fulcrum 74a as a fulcrum. The lower unit 74 is provided with a motive power transmitting gear 78 and the upper unit 76 is provided with a motive power transmitting gear 80. The lower unit 74 is provided with a collision avoiding unit 82.

The collision avoiding unit 82 is provided with a fixed portion 82a, an elastic portion 82b that extends from the fixed portion 82a, and a rack portion 82c that is provided on a tip end of the elastic portion 82b. The fixed portion 82a is attached to the lower unit 74 such that the collision avoiding unit 82 is fixed to the lower unit 74. The elastic portion 82b is formed of elastic material such as a flat spring or plastic, for example.

When the upper unit 76 is rotated toward the lower unit 74 in a state as illustrated in the upper drawing of FIG. 16, the motive power transmitting gear 80 is also rotated in accordance with the rotation of the upper unit 76 as illustrated in the lower drawing of FIG. 16. At this time, the motive power transmitting gear 80 comes into contact with the rack portion 82c of the collision avoiding unit 82. Furthermore, when the upper unit 76 is rotated toward the lower unit 74 side, the motive power transmitting gear 80 rotates while pushing the rack portion 82c away. At this time, the elastic portion 82b is displaced in a counterclockwise direction in the lower drawing of FIG. 16 and thus the rack portion 82c and the motive power transmitting gear 80 mesh with each other.

Furthermore, when the upper unit 76 is rotated toward the lower unit 74 side, the motive power transmitting gear 80 is rotated by the rack portion 82c meshing with the motive power transmitting gear 80 in accordance with the rotation toward the lower unit 12 side.

Therefore, when the upper unit 76 is rotated toward the lower unit 74 side such that the upper unit 76 is closed, the motive power transmitting gear 80 comes into contact with the motive power transmitting gear 78 while rotating at a low speed. Accordingly, contact between tip ends of the teeth of the gears can be prevented and the motive power transmitting gear 78 and the motive power transmitting gear 80 can more smoothly mesh with each other. In addition, in a state where the upper unit 76 is closed with respect to the lower unit 74 (FIG. 17), since the rack portion 82c of the collision avoiding unit 82 is provided on the tip end of the elastic portion 82b, the motive power transmitting gear 80 and the rack portion 82c do not mesh with each other. As a result, in a state where the upper unit 76 is closed with respect to the lower unit 74, the collision avoiding unit 82 does not hinder transmission of motive power from the motive power transmitting gear 78 to the motive power transmitting gear 80.

Fifth Embodiment

A collision avoiding unit according to the fifth embodiment will be described in FIG. 18. In a scanner 84, an upper unit 88 is configured to be able to rotate relative to a lower unit 86 with a rotary fulcrum 86a as a fulcrum. The lower unit 86 is provided with a motive power transmitting gear 90 and the upper unit 88 is provided with a sun gear 92 and a planetary gear 94. The planetary gear 94 is configured to be able to revolve around the sun gear 92.

In the upper drawing of FIG. 18, in a state where the upper unit 88 is open with respect to the lower unit 86, the planetary gear 94 hangs down from the sun gear 92 due to the own weight thereof. When the upper unit 88 is rotated with respect to the lower unit 86, the planetary gear 94 comes into contact with the motive power transmitting gear 90 as illustrated in the lower drawing of FIG. 18. When the upper unit 88 is closed with respect to the lower unit 86, the planetary gear 94 is pushed up by the motive power transmitting gear 90.

Accordingly, the planetary gear 94 is positioned closer to a +Z direction side than the motive power transmitting gear 90 while revolving around the sun gear 92. At this time, since the planetary gear 94 revolves around the sun gear 92, the planetary gear 94 itself also rotates. As a result, the planetary gear 94 comes into contact with the motive power transmitting gear 90 while rotating and thus contact between tip ends of the teeth of the gears can be prevented. In addition, in a case where the planetary gear 94 and the motive power transmitting gear 90 do not properly mesh with each other, since the planetary gear 94 can escape to the +Z direction side of the motive power transmitting gear 90, damage on the teeth can be suppressed.

Embodiment Other than Third to Fifth Embodiments

In the third to fifth embodiments, a configuration that prevents collision between the teeth of the gears has been described. However, instead of this configuration, a configuration in which a sensor that detects an operation of closing the upper units 14, 76, and 88 with respect to the lower units 12, 74, and 86 is provided and a motive power source side gear is rotated at a low speed in accordance with a detection signal from the sensor may also be adopted.

To summarize the above description, the medium feeding device 58 (FIG. 2) includes the medium placement unit 16 on which the medium P is placed, the feed roller 26 that feeds the medium P from the medium placement unit 16, the separation roller 28 that nips the medium P between the feed roller 26 and the separation roller 28 to separate the medium P, the separation driving motor 42 that applies a rotational torque to the separation roller 28 and the controller 38 that controls the separation driving motor 42. The rotational torque is transmitted to the separation roller 28 from the separation driving motor 42 not via a torque limiter and the separation roller 28 separates the medium P with the rotational torque applied to the separation roller 28.

According to this configuration, the rotational torque is transmitted to the separation roller 28 from the separation driving motor 42 not via the torque limiter and the separation roller 28 separates the medium P with the rotational torque applied to the separation roller 28. Therefore, it is possible to easily adjust a separating ability with respect to the medium P of the separation roller 28 by adjusting the rotational torque and thus it is possible to properly separate a plurality of kinds of media.

The multi-feeding detection sensor 54 that detects multi-feeding of the medium P is provided on the downstream side of the nip position between the feed roller 26 and the separation roller 28 and in a case where it is determined that there is multi-feeding of the medium P based on the detection information from the multi-feeding detection sensor 54, the controller 38 causes the separation roller 28 to rotate in a rotation direction in which the medium P is returned to the upstream side.

In this case, the controller 38 causes the separation roller 28 to rotate in the rotation direction in which the medium P is returned to the upstream side in a case where it is determined that there is multi-feeding of the medium P based on the detection information from the multi-feeding detection sensor 54. Therefore, even when a leading end of the medium P proceeds up to a position on the downstream side of the nip position between the feed roller 26 and the separation roller 28, the medium can be returned to the upstream side and thus it is possible to properly perform a next feeding operation.

In a case where it is determined that there is multi-feeding of the medium P based on the detection information from the multi-feeding detection sensor 54, the controller 38 increases the value of a current that is applied to the separation driving motor 42 at the time of a next medium feeding operation such that the rotational torque is increased.

According to this configuration, the controller 38 increases the value of a current that is applied to the separation driving motor 42 at the time of a next medium feeding operation such that the rotational torque is increased in a case where it is determined that there is multi-feeding of the medium P based on the detection information from the multi-feeding detection sensor 54. Therefore, it is possible to suppress multi-feeding of the medium P by increasing the separating ability of the separation roller 28.

The passage detection sensor 56 that detects passage of the medium P is provided on the downstream side of the nip position between the feed roller 26 and the separation roller 28 and in a case where the passage detection sensor 56 does not detect passage of a leading end of the medium P until a predetermined period of time elapses after the rotation of the feed roller 26 is started, the controller 38 decreases the value of a current applied to the separation driving motor 42 such that the rotational torque is decreased.

According to this configuration, the controller 38 decreases the value of a current applied to the separation driving motor 42 such that the rotational torque is decreased in a case where the passage detection sensor 56 does not detect the passage of the leading end of the medium P until the predetermined period of time elapses after the rotation of the feed roller 26 is started. Therefore, it is possible to fix non-feeding of the medium P by decreasing the separating ability of the separation roller 28.

Each of the scanners 10, 72, and 84 includes the image reading section 32 that reads an image, the pair of transportation rollers 30 that transports the medium P to a reading position of the image reading section 32, and the medium feeding device 58 that feeds the medium M to the pair of transportation rollers 30.

The separation driving motor 42 that applies the rotational torque to the separation roller 28 is different from the feed driving motor 40 which is a drive source of the feed roller 26 and is different from the transportation driving motor 44 which is a drive source of the pair of transportation rollers 30. According to this configuration, the independence of control that is performed by using the separation roller 28 is improved and the degree of freedom in control is improved.

The printer 96 includes the recording head 100 that performs recording on the medium, the pair of transportation rollers 102 that transports the medium P to a recording position of the recording head 100, and the medium feeding device 58 that feeds the medium P to the pair of transportation rollers 102.

It is a matter of course that the invention is not limited to the above-described embodiments, various modifications can be made within the scope of the invention described in the claims, and the modifications are also included within the scope of the invention.

The entire disclosure of Japanese Patent Application No. 2017-187585, filed Sep. 28, 2017 is expressly incorporated by reference herein.

What is claimed is:

1. A medium feeding device comprising:
   a medium placement unit on which a medium is placed;
   a feed roller that feeds the medium from the medium placement unit;
   a separation roller that nips the medium between the feed roller and the separation roller to separate the medium;
   a motor that applies a rotational torque to the separation roller; and
   a control unit that controls the motor,
   wherein the rotational torque is transmitted to the separation roller from the motor not via a torque limiter and the separation roller separates the medium with the rotational torque applied to the separation roller,
   wherein the control unit selectively increases a value of a current that is applied to the motor that applies the rotational torque to the separation roller during rotation of the separation roller such that the rotational torque is selectively increased,
   wherein the rotation torque is transmitted to the separation roller when the separation roller is to separate the medium and wherein when the control unit detects that the medium is not a cut sheet, the control unit drives the motor to rotate the separation roller in a direction to feed the medium.

2. The medium feeding device according to claim 1, further comprising:
   a multi-feeding detection unit that detects multi-feeding of the medium and that is provided on a downstream side of a nip position between the feed roller and the separation roller,
   wherein, in a case where it is determined that there is multi-feeding of the medium based on detection information from the multi-feeding detection unit, the control unit causes the separation roller to rotate in a rotation direction in which the medium is returned to an upstream side.

3. The medium feeding device according to claim 2,
   wherein, in a case where it is determined that there is multi-feeding of the medium based on detection information from the multi-feeding detection unit, the control unit increases the value of the current that is applied to the motor at the time of the next medium feeding operation such that the rotational torque is increased.

4. The medium feeding device according to claim 1, further comprising:
   a passage detection unit that detects passage of the medium and that is provided on a downstream side of a nip position between the feed roller and the separation roller,
   wherein in a case where the passage detection unit does not detect passage of a leading end of the medium until a predetermined period of time elapses after rotation of the feed roller is started, the control unit decreases the value of a current applied to the motor such that the rotational torque is decreased.

5. An image reading apparatus comprising:
   a reader that reads an image;
   a pair of transportation rollers that transports a medium to a reading position of the reader; and
   the medium feeding device according to claim 1 that feeds the medium to the pair of transportation rollers.

6. The image reading apparatus according to claim 5,
   wherein the motor that applies the rotational torque to the separation roller is different from a drive source of the feed roller and is different from a drive source of the pair of transportation rollers.

7. A recording apparatus comprising:
a recording unit that performs recording on a medium;
a pair of transportation rollers that transports the medium to a recording position of the recording unit; and
the medium feeding device according to claim 1 that feeds the medium to the pair of transportation rollers.

* * * * *